United States Patent [19]
Kakinami et al.

[11] Patent Number: 4,942,533
[45] Date of Patent: Jul. 17, 1990

[54] MOBILE RANGE FINDER

[75] Inventors: Toshiaki Kakinami, Kawasaki; Shigemitsu Hamajima, Obu, both of Japan

[73] Assignee: Aisin Seiki Kabushiki Kaisha, Aichi, Japan

[21] Appl. No.: 217,261

[22] Filed: Jul. 7, 1988

[30] Foreign Application Priority Data

Jul. 9, 1987 [JP] Japan .................. 62-171678

[51] Int. Cl.⁵ .................. G06K 9/46; G01C 3/00
[52] U.S. Cl. .................. 364/449; 364/458; 382/22; 356/3; 340/937
[58] Field of Search .................. 364/426.04, 424.02, 364/424.01, 443, 449, 456, 513, 458; 340/933, 937; 356/3; 382/22, 23, 25; 180/169

[56] References Cited

U.S. PATENT DOCUMENTS 4,630,109 12/1986 Barton .................. 358/103
4,709,264 11/1987 Tamura et al. .................. 358/93
4,712,248 12/1987 Hongo .................. 382/22
4,757,450 12/1988 Etoh .................. 364/426.04
4,783,833 11/1988 Kawabata et al. .................. 382/22
4,805,018 2/1989 Nishimura et al. .................. 358/105
4,817,166 3/1989 Gonzalez et al. .................. 382/1
4,819,169 4/1989 Saitoh et al. .................. 364/424.02

Primary Examiner—Thomas G. Black
Attorney, Agent, or Firm—Sughrue, Mion, Zinn, Macpeak & Seas

[57] ABSTRACT

A mobile range finder for use on a first vehicle detects a relative distance to a second vehicle at a position in a monitoring direction in front of the first vehicle. A vanishing point is determined by extracting, for example, the continuous or intermittently continuous white lines dividing traffic lanes on the road on the basis of spatial changes in the features of the scene ahead of the first vehicle, and the angle of elevation of the optical axis of an optical picture information generating device such as a TV camera is obtained on the basis of the determined vanishing point to thereby detect the distance to a designated position in which the second vehicle will appear. Accodingly, it is possible to effect accurate detection of a distance independently of the conditions of the first vehicle, such as pitching.

10 Claims, 15 Drawing Sheets

MOBILE RANGE FINDER

BACKGROUND OF THE INVENTION

1. Field of the Invention

The present invention relates to a mobile range finder for use on a vehicle to detect a relative distance to a desired position in a set monitoring direction, for example, a range finder for detecting the distance between two vehicles.

2. Description of the Related Art

As a prior art of the type described above, there is known a range finder designed to measure the distance between two vehicles by making use of microwaves, ultrasonic waves and the like. However, the prior art has the problem that interference occurs when a vehicle equipped with the same type of range finder comes close to the vehicle concerned, and therefore the use of this type of range finder has heretofore been limited only to detection of the distance between two vehicles which are apart from each other at a considerably short distance, for example, detection of a rearward clearance at the time when the vehicle is being backed up.

Japanese Patent Laid-Open No. 59-197816 (1984) discloses an apparatus which has memory means stored with feature data representing the features of various kinds of vehicle to detect the distance between two vehicles by the following method. Namely, two picture signals representative of the forward view from the vehicle equipped with this apparatus which are obtained by means of two TV cameras are each processed on the basis of feature parameters. Each processed data is compared with the feature data stored in the memory means to detect a vehicle which is ahead of the vehicle concerned, and trigonometrical measurement is carried out on the basis of the spatial offset between the two pieces of processed data concerning the vehicle ahead to thereby detect the distance between the two vehicles.

According to the disclosed apparatus, neither microwaves nor ultrasonic waves are used; therefore, no interference occurs even if the same type of apparatus comes close to it.

The apparatus of the type described above suffers, however, from the following disadvantages. Since vehicle feature data is employed to detect a vehicle which is ahead of the vehicle equipped with the apparatus, it is necessary to store feature data concerning all the existing types of vehicle. Further, every time a new type of vehicle is put on sale, data concerning it must be registered. In other words, it is necessary not only to prepare a memory means having a considerably large capacity but also to renew the contents of the memory means as occasion demands, which is inconvenient and impractical. In addition, to retrieve the feature data stored in the memory means, a great deal of information processing is needed and an excessively long processing time is required.

Separately from the above, there is an idea of detecting the distance between two vehicles by attaching a luminous marker to the rear end of each vehicle, recognizing the marker of a vehicle ahead of the vehicle concerned by reading it with a non-scanning type position sensor that utilizes a lateral photoelectric effect on the surface of a semiconductor, and detecting the distance to the vehicle ahead on the basis of the installation angle of the position sensor to the road surface and the level at which the sensor is installed. In this case, trigonometrical measurement is conducted on the basis of the fact that the installation angle of the position sensor is invariable because it is fixed to the vehicle. However, the vehicle pitches incessantly during traveling due to acceleration and deceleration as well as the conditions of the road surface, causing the installation angle of the position sensor to the road surface to vary incessantly. Therefore, the above-described idea of detecting the distance between two vehicles is inappropriate.

SUMMARY OF THE INVENTION

In view of the above-described circumstances, it is a primary object of the present invention to provide a mobile range finder for use on a first vehicle which is designed to detect the distance to a second vehicle at a position in a monitoring direction irrespective of the moving state of the vehicle.

To this end, the present invention provides a mobile range finder comprising: optical picture information generating means installed at a predetermined position on a first vehicle to provide an image of at least a part of a scene in a monitoring direction and generate corresponding picture information an image plane; edge extracting means for extracting a region where the picture information generated by the optical picture information generating means shows a distinct change; component extracting means for extracting a distinct component comprised of lane marking lines on a road in each region extracted by the edge extracting means; vanishing point determining means including selecting means for selecting from the lines extracted by the component extracting means at least one line included in a preset positive slope region and at least one line included in a preset negative slope region and means for calculating spatial information concerning said vanishing point from a theoretical point of intersection of respective lines extensions of said lines; inclination angle detecting means for determinating an angle of elevation between the optical axis of said optical picture information generating means and a reference line extending toward the vanishing point on the basis of the spatial information concerning the vanishing point and the location of an image of said vanishing point; on said image plane designating means for designating a desired position in said scene in which said second vehicle would first appear; designated spatial information generating means for generating spatial information corresponding to the desired position designated by the designating means; and distance detecting means for detecting the distance from the first vehicle to the position designated by the designating means to determine the distance from said first vehicle to said second vehicle in said desired position on the basis of the spatial information generated by the designated spatial information, information concerning the level of the position at which the optical picture information generating means is installed, and the inclination angle information detected by the inclination angle detecting means.

On a speedway, for example, traffic lanes are divided by continuous or intermittently continuous white lines. Since there is a large density difference between the white lines and the road surface, picture information corresponding to the scene ahead of the vehicle shows a distinct change at the boundary between a white line and the road surface. Accordingly, it is possible to extract the white line component by taking notice of a spatial change in the picture information.

On the other hand, the white lines extend parallel to both sides of the vehicle concerned and therefore join together at the vanishing point ahead of the vehicle. In other words, if the white line components are extended within the sampling space, the point of intersection of the respective extensions is the vanishing point.

If the vanishing point is obtained, since the spatial information concerning the imaging optical axis in the sampling space is known, it is possible to calculate an angle of elevation between a reference line extending toward the vanishing point, i.e., the horizontal line, and the imaging optical axis. This will be explained in more detail with reference to FIG. 2.

In FIG. 2, the reference numeral 8 denotes an imaging lens of the optical picture information generating means and reference numeral 9 an imaging plane. Assuming that the projection of the vanishing point on the imaging plane 9 is VP and spatial information concerning VP is $y_0$ on the basis of the projection of the optical axis (two-dot chain line) on the imaging plane 9, the angle $\alpha$ between the optical axis and the horizontal line (chain line) is expressed as follows:

$$\alpha = \arctan y_0/F \quad (1)$$

where F is the focal length.

If, in this state, spatial information $y_1$ concerning the point of projection on the imaging plane 9 of the position of a vehicle which is ahead of the vehicle concerned is designated, the distance D between the two vehicles is readily obtained on the basis of the ratios of homologous triangles. More specifically, referring to FIG. 3 together with FIG. 2, since the following relation holds, $$D/h = D'/h' \quad (2)$$

the distance D is given as follows:

$$D = D' \cdot h/h' \quad (3)$$

Further, D' and h' are given as follows:

$$D' = D'' + \Delta = F\cos\alpha + y_1 \sin\alpha \quad (4)$$

$$h' = (y_0 - y_1)\cos\alpha \quad (5)$$

Therefore, the distance D between the two vehicles is given as follows:
$$D = (F + y_1 \tan\alpha) \cdot h/(y_0 - y_1) \quad (6)$$

When the vehicle pitches due to the road surface conditions, acceleration, deceleration or the like, the spatial information concerning the projection VP of the vanishing point on the imaging plane 9 changes in accordance with the pitching of the vehicle; therefore, the detection of the relative distance D is independent of the pitching. Accordingly, the present invention enables detection of the relative distance to a desired position in a set monitoring direction independently of the conditions of the vehicle.

The above and other objects, features and advantages of the present invention will become clear from the following description of the preferred embodiment thereof taken in conjunction with the accompanying drawings.

DESCRIPTION OF THE PREFERRED EMBODIMENTS

The present invention will be described hereinunder in more detail with reference to the accompanying drawings.

Figure 1:
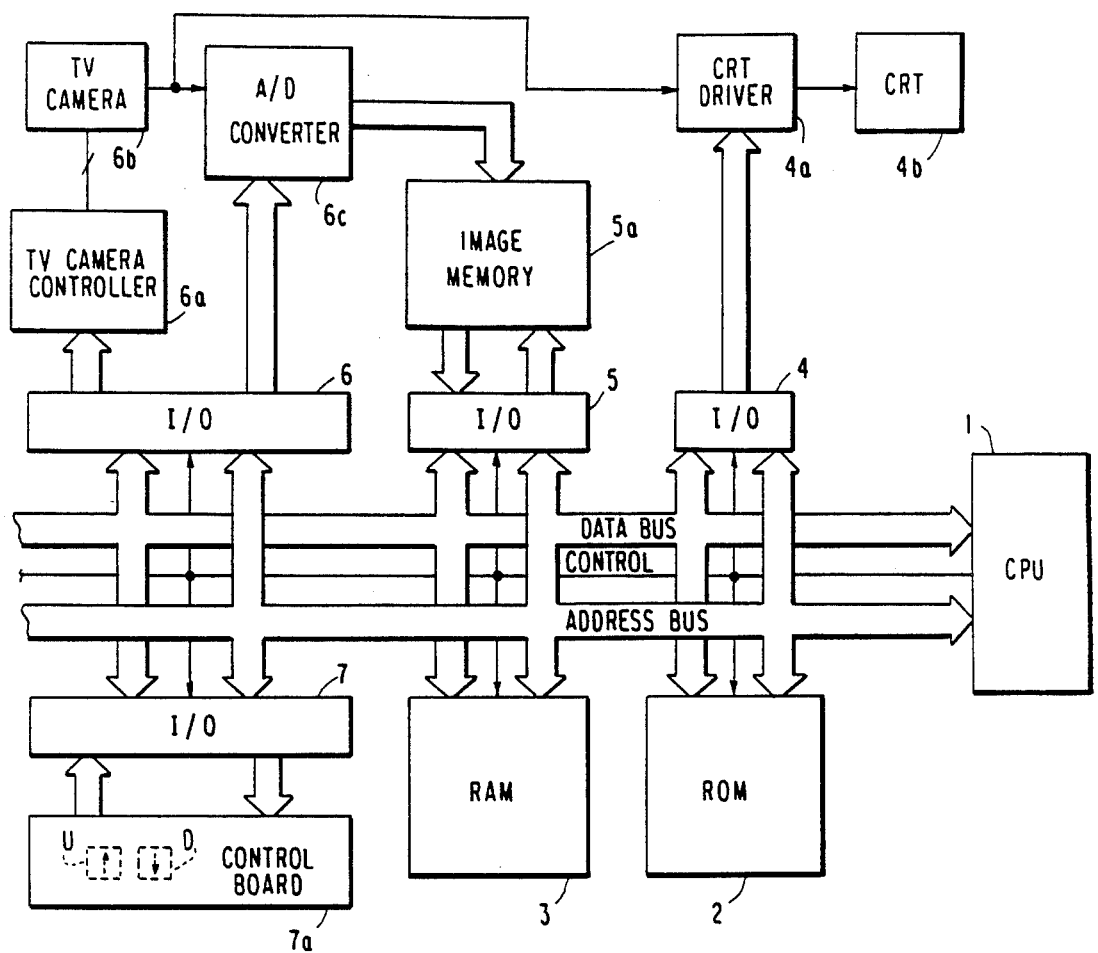
FIG. 1 is a block diagram showing the system arrangement of one embodiment of the mobile range finder according to the present invention.

FIG. 1 is a block diagram showing the system arrangement of one embodiment of the mobile range finder according to the present invention. This system is arranged using a microcomputer (hereinafter referred to as "CPU") 1 as a main constituent element. To the bus line of the CPU 1 are connected a read-only memory (ROM) 2 stored with control programs, a random access memory (RAM) 3 for storing parameters which are being processed, and input/output ports (I/O) 4, 5, 6 and 7 to which are respectively connected various kinds of constituent elements.

A TV camera 6b is installed inside the vehicle near the upper end of the central portion of the front window. The TV camera 6b has a two-dimensional CCD array for imaging the scene ahead of the vehicle to obtain an analog picture signal for 512×480 picture elements per frame. The picture signal obtained by the TV camera 6b is applied to an A/D converter 6c and a CRT driver 4a.

In the A/D converter 6c, the analog picture signal from the TV camera 6b is converted for each picture element into digital data (gradation data) representative of one of 256 gradation levels (the gradation 0: black level; the gradation 255: white level). The resulting digital data is delivered to an image memory 5a.

The CPU 1 controls the aperture of the TV camera 6b and the output level of the picture signal through a TV camera controller 6a and also synchronously controls the input and output of the A/D converter 6c and the writing of data into the image memory 5a.

The CRT driver 4a drives a CRT 4b on the basis of the gradation data delivered from the TV camera 6b, the CRT 4b being installed near the center of the indoor panel. More specifically, the scene ahead of the vehicle taken by the TV camera 6b appears on the CRT 4b.

A control board 7a is disposed in close proximity to the console box and provided with various control keyswitches including an "UP" key U and a "DOWN" key D which are actuated to move the cursor on the CRT 4b, together with an individual microcomputer for reading the operation of these keyswitches. Data concerning the cursor position which is designated by actuating the "UP" key U or the "DOWN" key D is applied to the CPU 1 and also to the CRT driver 4a. The CRT driver 4a displays a cursor on the CRT 4b on the basis of the position data.

The operation of the CPU 1 will next be roughly described with reference to the general flow of the CPU 1 shown in FIG. 4.

When the power supply is turned on, the CPU 1 initializes the RAM 3, the image memory 5a and other constituent elements in Step 1, and the processing of Steps 2 to 19 described hereinunder is then repeatedly executed.

In Step 2, the CPU 1 controls the TV camera 6b, the A/D converter 6c and the image memory 5a to write in the image memory 5a gradation data for 512×480 picture elements per frame concerning the scene ahead of the vehicle taken by the TV camera 6b.

Figure 7:
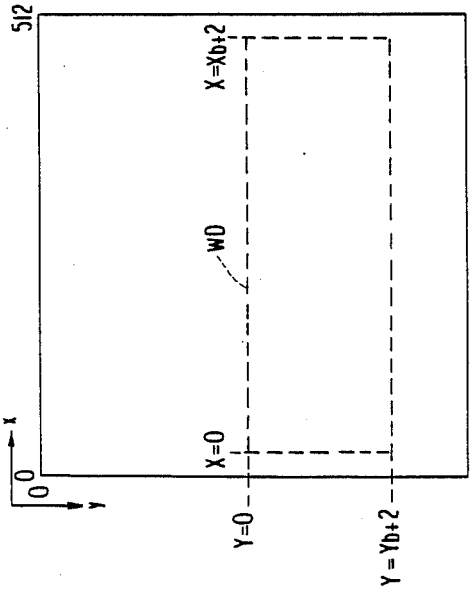
FIG. 7 is a plan view schematically showing a memory map in the image memory shown in FIG. 1.

In Step 3, a window region WD is set in the region for one frame IA. Thereafter, image processing is carried out in regard to the picture elements within the window WD. In this embodiment, however, since a window with a predetermined size is used, no processing is substantially carried out herein. The relationship between the window region WD and the frame region IA is shown in FIG. 7. In FIG. 7, the horizontal direction of the region IA is defined as the x-axis (the rightward sense being taken as the positive sense), while the vertical direction is defined as the y-axis (the downward sense being taken as the positive sense), and the coordinates of the picture elements contained therein are expressed by (x, y), whereas the horizontal direction of the window region WD is defined as the X axis (the rightward sense being taken as the positive sense), while the vertical direction is defined as the Y-axis (the downward sense being taken as the positive sense), and the coordinates of the picture elements contained therein are expressed by (X, Y). Accordingly, the X-Y coordinate system is a linear mapping of the x-y coordinate system.

In Step 4, each of the gradation data concerning the picture elements within the window WD is considered, and smoothing processing is carried out wherein the gradation data concerning each picture element under consideration is corrected by a simple mean of pieces of gradation data concerning the picture element under consideration and 8 neighboring picture elements which are in the vicinity of it (i.e., the center of a 3×3 pixel matrix is the picture element under consideration). This smoothing processing is conducted for the purpose of removing noise. It will be readily understood that, by averaging pieces of gradation data concerning a plurality of picture elements, the gradation between the picture elements is made continuous and the generation of noise is suppressed. At the same time, however, it may be feared that the above-described practice will deteriorate the resolution. Therefore, in this embodiment, the smoothing processing was carried out many times with the number of picture elements variously changed to observe the relationship between the achievement of suppression of noise and the deterioration of resolution and, as a result, a number of picture elements, i.e., 9, was determined.

In Step 5, the gradation data concerning the picture elements within the window WD which has been subjected to the smoothing processing is differentiated in the 45° direction and also in the 135° direction. This is based on the notice that the lane-dividing white lines extending along both sides, respectively, of the vehicle concerned are somewhat inclined within the frame. The edge of the right-hand white line is emphasized with the 45°-differentiated gradation data, and the edge of the left-hand white line is emphasized with the 135°-differentiated gradation data. In this differentiation, the edge is emphasized at positions where the gradation data spatially increases and decreases, respectively, for example, at both edges of a white line; however, the latter is removed in this embodiment.

In Step 6, a histogram (gradation—number of picture element) is prepared for each gradation in regard to each of the 45°- and 135°-differentiated gradation data.

Figure 11:
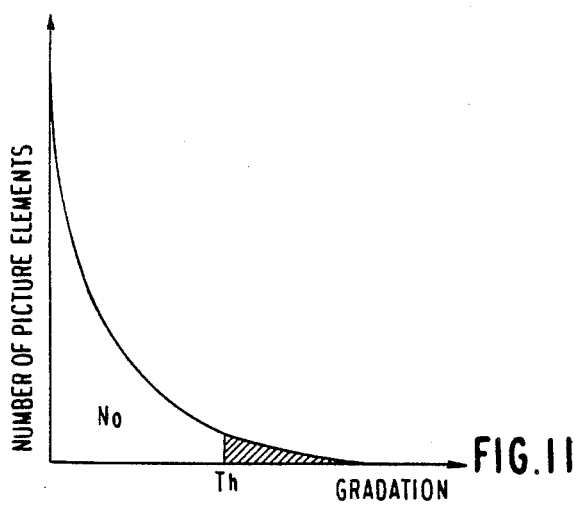
FIG. 11 is a graph showing one example of a histogram prepared by the microcomputer shown in FIG. 1.

In Step 7, a threshold value is set by the percentile method on the basis of a histogram based on each of the 45° and 135°-differentiated gradation data. FIG. 11 shows one model of the histogram concerning the gradation data. According to the percentile method, a gradation at which the number of picture elements included in the hatched region accounts for n% of the total number of sampled picture elements (the number of picture elements within the window) is set as a threshold value Th. In other words, the number of picture elements which are lighter (higher in terms of gradation) accounts for n% of the total number of sampled picture elements. In this embodiment, the value for n is determined to be 1.

In Step 8, the 45°- and 135°-differentiated gradation data are binary-encoded on the basis of the respective threshold values set in Step 7, thereby preparing 45° binary-coded data and 135° binary-coded data. In the binary encoding, binary-coded data concerning a picture element which is as light as or lighter than the corresponding threshold value (i.e., higher in terms of gradation; including the level of gradation determined to be the threshold value) is defined as "1" which is representative of the presence of an image component, whereas binary-coded data concerning a picture element which is darker than the corresponding threshold value (i.e., lower in terms of gradation; excluding the level of gradation determined to be the threshold value) is defined as "0" which is representative of the absence of an image component.

In Step 9, the 45° binary-coded data and 135° binary-coded data are synthesized together to prepare binary-coded data concerning the picture elements within the window WD. In this embodiment, the synthesis is effected by an exclusive-OR operation to remove, as noise, data having no directional qualities, i.e., data which appears in both the 45°- and 135°-differentiated gradation data.

In Step 10, the binary-coded data concerning the picture elements within the window WD is thinned so as to have a line width which is equal to the width of one picture element according to the Hilditch algorithm.

In Step 11, noticing the continuity, the binary-coded data concerning picture elements having image components are traced to label the thinned line segments. At this time, a line segment consisting of five or less consecutive picture elements is removed as a noise. The number of picture elements, i.e., 5, that is used as a criterion is a value determined experimentally.

In Step 12, the labeled line segments are examined to select line segments which are preferably used as data representative of a white line extending along the right-hand side of the vehicle and line segments which are preferably used as data representative of a white line extending along the left-hand side of the vehicle. Experimental data is employed as criteria for the examination and selection.

In Step 13, among the selected line segments, the longest line segment for the right-hand white line and the longest line segment for the left-hand white line are extracted and the other line segments are combined together. In this case, each extension of each of the longest line segments is given a width corresponding to ±7 picture elements (determined experimentally) in the vertical direction (Y-axis direction), and line segments which are out of said range are excluded.

In Step 14, an equation expressing the right-hand white line is obtained from the selected longest line segment for the right hand white line and the second longest line segment in the combined line segments (if there is no second longest line segment, the longest line segment is employed alone), and an equation expressing the left-hand white line is obtained from the selected longest line segment for the left-hand white line and the second longest line segment (if there is no second longest line segment, the longest line segment is employed alone).

In Step 15, the equations expressing the right- and left hand white lines are used as a simultaneous system of equations to obtain the coordinates of the point of intersection, that is, the vanishing point VP.

Figure 2:
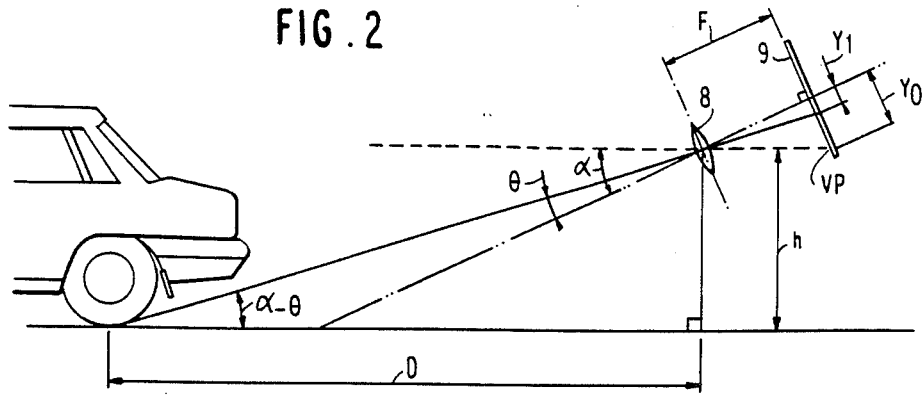
FIG. 2 shows the principle of the range finding operation according to the present invention.

In Step 16, the angle $\alpha$ of the optical axis of the TV camera 6a to the horizontal line (the chain line in FIG. 2) is obtained from the vertical component (y-coordinate) $y_0$ of the coordinates of the vanishing point VP and the focal length of the TV camera 6a according to the aforementioned equation (1):

$$\alpha = \arctan y_0/F \qquad (1)$$

In fact, the angle $\alpha$ is obtained as follows (see FIG. 2):

$$\tan\alpha = y_0/F \qquad (1)'$$

In Step 17, the CPU 1 reads y-coordinate data $y_1$ concerning the cursor position which is transferred from the microcomputer provided on the control board 7a.

Figure 3:
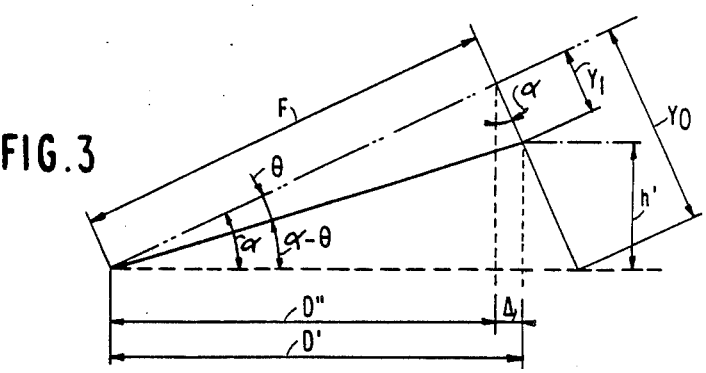
FIG. 3 is an enlarged view showing a part of FIG. 3 in detail.

In Step 18, the CPU 1 computes the distance to the forward position represented by the cursor y-coordinate data $y_1$. Although this arithmetic operation has been described above, it will be explained again below for confirmation. As will be clear from FIGS. 2 and 3, the distance D is expressed as follows:

$$D = D' \cdot h/h' \qquad (3)$$

$$D' = D'' + \Delta = F\cos\alpha + y_1\sin\alpha \qquad (4)$$

$$h' = (y_0 - y_1)\cos\alpha \qquad (5)$$

$$\therefore D = (F + y_1\tan\alpha) \cdot h/(y_0 - y_1) \qquad (6)$$

Predetermined values are substituted into the equation (6) to compute the distance D.

In Step 19, data concerning the computed distance D is transferred to the CRT driver 4a.

The CRT driver 4a effects character indication of the transferred data in close proximity to the cursor.

The following is a detailed description of each processing by the CPU 1 briefly explained above.

Figure 4:
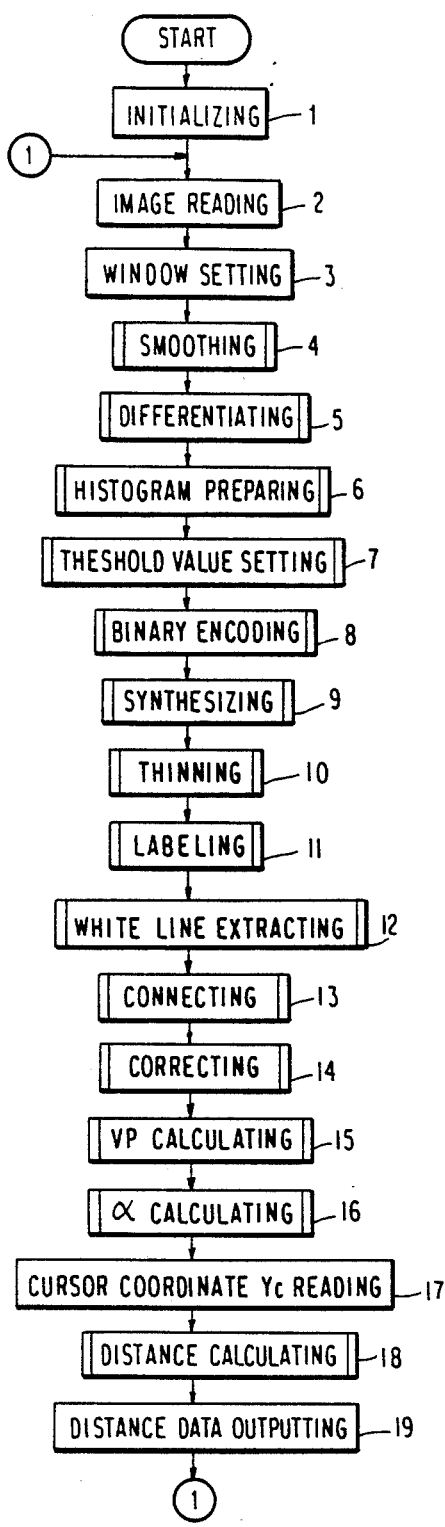
FIGS. 4 to 5h are flowcharts showing the operation of the microcomputer shown in FIG. 1.
Figure 5B:
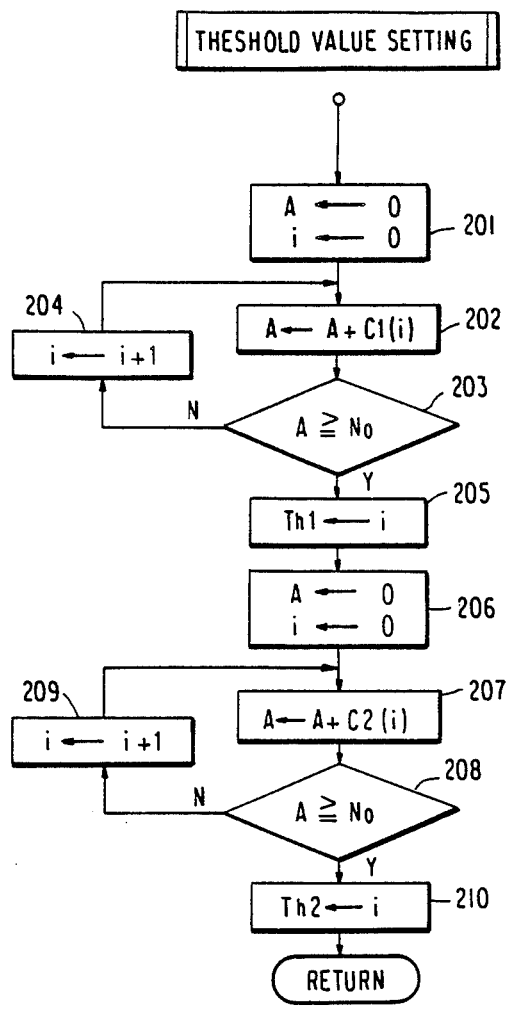
Figure 5A:
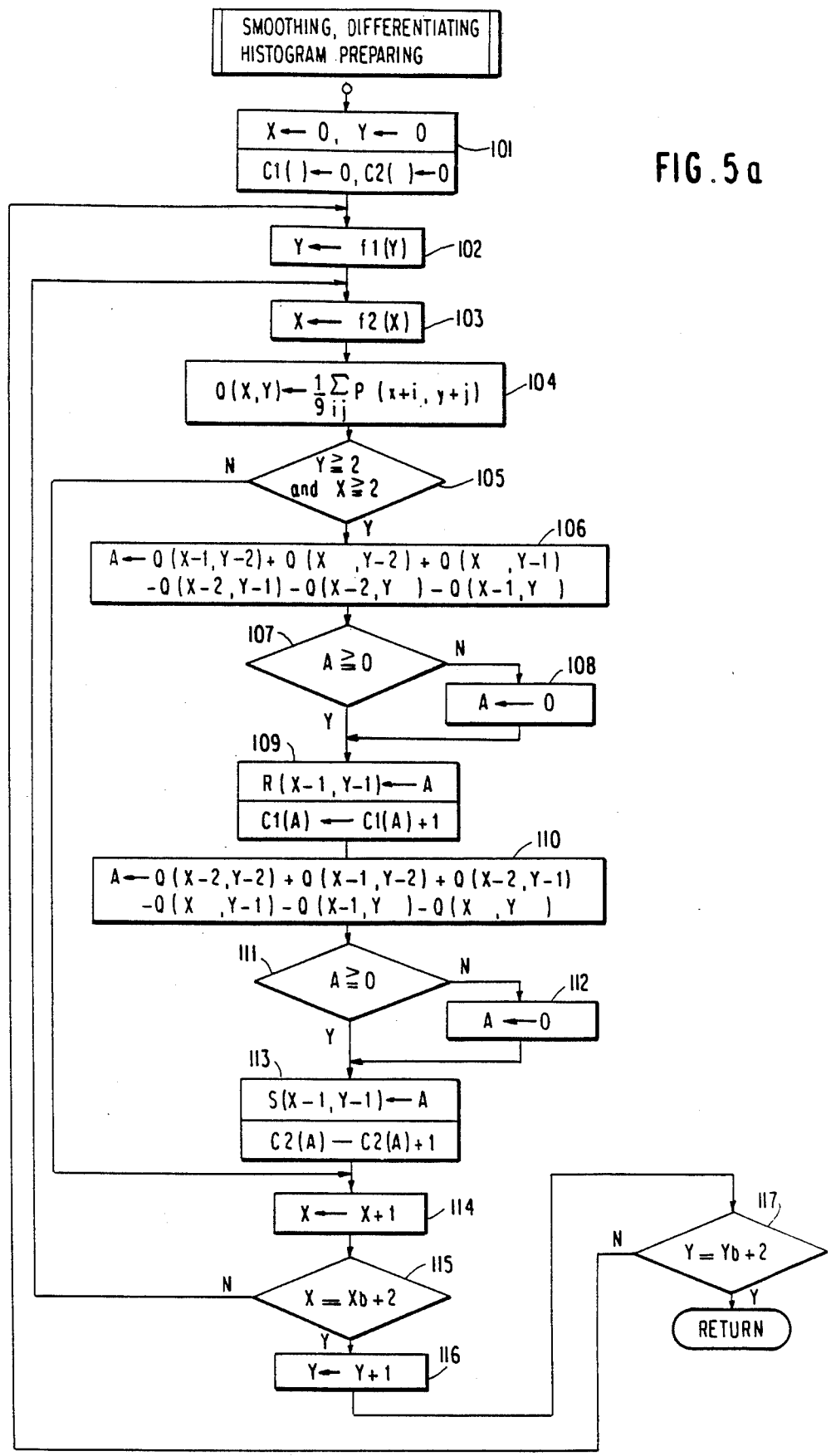

FIG. 5a shows a sub-flow in which are simultaneously executed the smoothing processing in Step 4 shown in FIG. 4, the differentiating processing in Step 5 and the histogram preparing processing in Step 6. The sub-flow will next be explained with reference to FIG. 5a.

Figure 8:
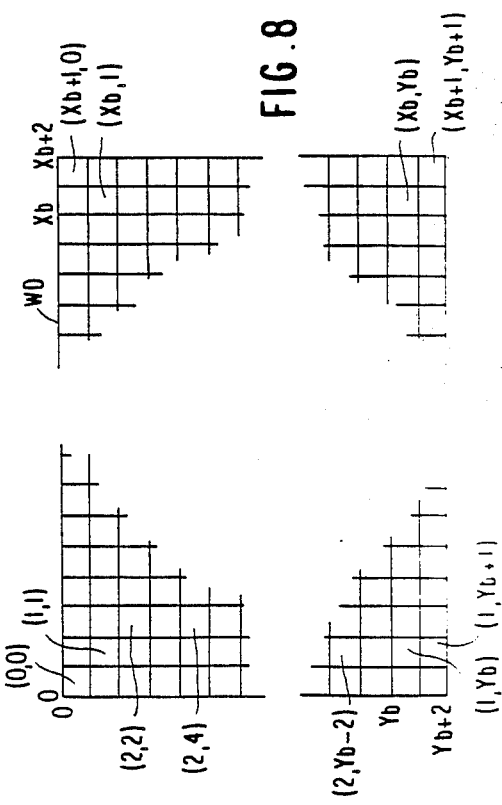
FIG. 8 is a plan view showing the address of each of the picture elements within a window set by the microcomputer shown in FIG. 1.

In Step 101, the values of X and Y are reset to 0, and memory regions C1 and C2 in the RAM 3 are cleared. As described above, X and Y are coordinates representing the addresses of picture elements within the window WD and take values from 0 to Xb+2 and from 0 to Yb+2, respectively, as shown in FIG. 8. In this embodiment, the window WD is set so as to be in excess of the actual sampling region by an amount corresponding to one picture element all around the actual sampling region; therefore, the actual sampling region is a square region with four corners defined by picture elements having respective addresses (1,1), (Xb,1), (1,Yb) and (Xb, Yb). This is due to the following reasons. Since a 3×3 pixel matrix is employed in the processing such as differentiation and thinning, there is a need for data concerning 8 neighboring picture elements surrounding a picture element under consideration, that is, a picture element which is an object of processing, and dummy data concerning picture elements which are out of the sampling region are needed to process picture elements which define the edge of the sampling region.

In Step 102, the value of Y is linearly transformed to set a value for y, whereas, in Step 103, the value of X is linearly transformed to set a value for x. As has been described above, the X-Y coordinate system is a linear mapping of the x-y coordinate system, and since the window WD is set within the frame region IA, the above-described transformation is a simple addition.

Figure 9:
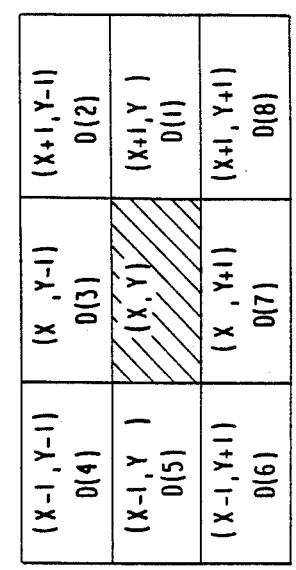
FIGS. 9 and 10 are plan views showing the addresses of the picture elements within a 3×3 pixel matrix set by the microcomputer shown in FIG. 1.

In Step 104, smoothing processing is executed for each picture element. FIG. 9 shows a model of the 3×3 pixel matrix based on the X-Y coordinate system. If this model is transformed into a model based on the x-y coordinate system, the address of each of the picture elements included in this matrix may be expressed by (x+i, y+j), wherein i and j are variables which are variable independently of each other so as to be −1, 0 or 1. Accordingly, a simple mean of gradation data P(x+i, y+j) concerning 9 picture elements represented by these addresses is determined to be gradation data concerning the picture element under consideration and stored in the region of the address (X,Y) within the memory Q.

If the Y-address is 1 or less, the process proceeds from Step 105 to Step 114, in which the value of X is incremented by 1, and the process then returns to Step 103. In this way, the smoothing processing is repeated with the picture element under consideration being renewed one after another.

Upon completion of the smoothing processing of a picture element at the right-hand end of the window WD, i.e., a picture element corresponding to the address (Xb+1,0), the value of X, when incremented by 1 in Step 105, is Xb+2. Accordingly, the process proceeds to Step 116, in which the value of Y is incremented by 1, and the process then returns to Step 102. In this way, the above-described smoothing processing is repeated with the picture element under consideration being renewed one after another.

Upon completion of the smoothing processing of a picture element corresponding to the address (2,2) in the window WD, the memory Q has been stored with the smoothed gradation data concerning all the picture elements in the first and second rows (horizontal arrays of regions) and the smoothed gradation data concerning the picture elements in the third row up to the third column (vertical array of regions). With these gradation data, it is possible to arrange a 3×3 pixel matrix having a picture element of the address (1,1) defined as one which is under consideration. More specifically, as will be clear from FIG. 8, if $X \geq 2$ and $Y \geq 2$, it is possible to arrange a 3×3 pixel matrix consisting of picture elements which have already been subjected to smoothing with a picture element of the address (X−1,Y−1) defined as one which is under consideration. In consequence, the process proceeds from Step 105 to Step 106 and further to Steps which follow it, thus executing the differentiating processing and the histogram preparing processing. In other words, the differentiating processing and the histogram preparing processing are executed with a delay corresponding to one picture element for each of the X and Y addresses with respect to the smoothing processing.

Figure 10:
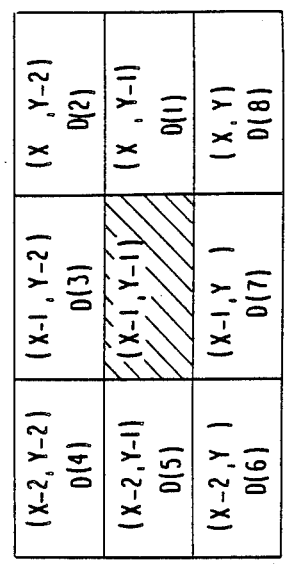

In Step 106, 45° differentiation is executed with a picture element of the address (X−1,Y−1) defined as one which is under consideration. The 45° differentiation is a processing for obtaining a difference between 3 picture elements at the right top of the 3×3 pixel matrix and 3 picture elements at the left bottom of the matrix. FIG. 10 shows the addresses of the picture elements within the 3×3 pixel matrix arranged with a picture element of the address (X−1,Y−1) defined as one which is under consideration (the hatching shows a picture element under consideration). Here, with the smoothed gradation data stored in the memory Q which are designated by the addresses shown in FIG. 10, the following arithmetic operation is carried out:

$$Q(X-1,Y-2)+Q(X,Y-2)+Q(X,Y-1)$$

$$-Q(X-2,Y-1)-Q(X-2,Y)-Q(X-1,Y)$$

and the result of the calculation is stored in the A register.

In the 45° differentiation, when there is, for example, a leftwardly upward white line, positive differentiated gradation data is extracted from the left lower edge of the white line, while negative differentiated gradation data is extracted from the right upper edge of the white line, as described above. In this embodiment, the negative differentiated gradation data is deleted. Accordingly, if the value in the A register is negative, the value is changed to zero in Step 108.

In Step 109, the 45° differentiated gradation data in the A register is stored in the region of the address (X−1,Y−1) within the memory R, and the data stored in that region of the memory C1 which has the address represented by the value of the A register is incremented by 1. More specifically, data representative of the number of picture elements at a particular gradation is stored in that region of the memory C1 which has an address corresponding to said gradation.

In Step 110, 135° differentiation is executed with a picture element of the address (X−1,Y−1) defined as one which is under consideration. The 135° differentiation is a processing for obtaining a difference between 3 picture elements at the left top of the 3×3 pixel matrix and 3 picture elements at the right bottom of the matrix. Here, with the smoothed gradation data stored in the memory Q which are designated by the addresses shown in FIG. 10, the following arithmetic operation is carried out:

$$Q(X-2,Y-2)+Q(X-1,Y-2)+Q(X-2,Y-1)$$

$$-Q(X,Y-1)-Q(X-1,Y)-Q(X,Y)$$

and the result of the calculation is stored in the A register.

In the 135° differentiation, when there is, for example, a rightwardly upward white line, positive differentiated gradation data is extracted from the right lower edge of the white line, while negative differentiated gradation data is extracted from the left upper edge of the white line. In this embodiment, the negative differentiated gradation data is deleted in the same way as the above. Accordingly, if the value in the A register is negative, the value is changed to zero in Step 112.

In Step 113, the 135° differentiated gradation data in the A register is stored in the region of the address (X−1,Y−1) within the memory S, and the data stored in that region of the memory C2 which has the address represented by the value of the A register is incremented by 1. More specifically, data representative of the number of picture elements at a particular gradation is stored in that region of the memory C1 which has an address corresponding to said gradation.

By repeating the above-described processing, 45° differentiated gradation data concerning the sampling region is prepared in the memory Q, while 135° differentiated gradation data concerning the sampling region is prepared in the memory S, and a histogram of 45° differentiated gradation data is prepared in the memory C1, while a histogram of 135° differentiated gradation data is prepared in the memory C2.

FIG. 5b shows a sub-flow in which the threshold value setting processing in Step 8 shown in FIG. 4 is executed. The sub flow will next be explained with reference to FIG. 5b.

In Step 201, the value in the A register is cleared, and the value of i is reset to 0.

In the loop consisting of Steps 202, 203 and 204, the value of i is incremented on each occasion to cumulate data representative of a number of picture elements stored in the region of the address i in the memory C1. More specifically, numbers of picture elements respectively corresponding to the gradations are cumulated sequentially from the gradation 0 on the basis of the 45° differentiated gradation data histogram prepared in the memory C1. As has been described above, the reference that is used to set a threshold value in the percentile method is defined by a value whereby 1% of the total number of sampled picture elements is determined to be relatively light (higher in terms of gradation) picture elements. Therefore, if numbers of picture elements are cumulated from the lowest gradation, a gradation at which the cumulative value, that is, the value of the A register, accounts for 99% of the total number of sampled picture elements is a target threshold value. Accordingly, the constant $N_0$ is set at $Xb \times Yb \times 0.99$, and the value for i at the time when the value of the A register in the above-described loop exceeds the constant $N_0$ is set so as to be a threshold value Th1 (first threshold value) for 45° differentiated gradation data in Step 205.

In Steps 206 to 210, a threshold value Th2 (second threshold value) for 135° differentiated gradation data is set in a manner similar to the above.

Figure 5C:
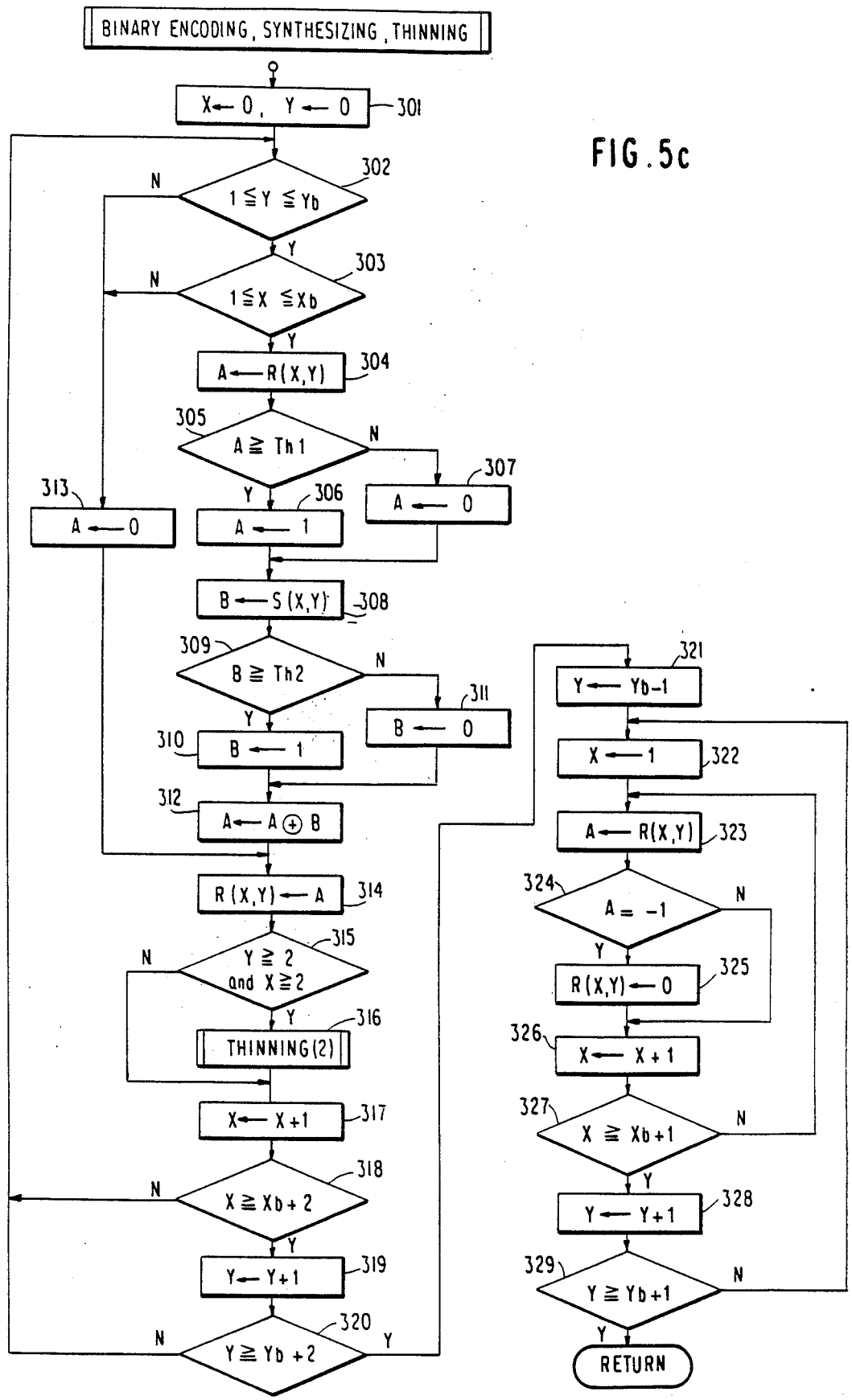
Figure 5D:
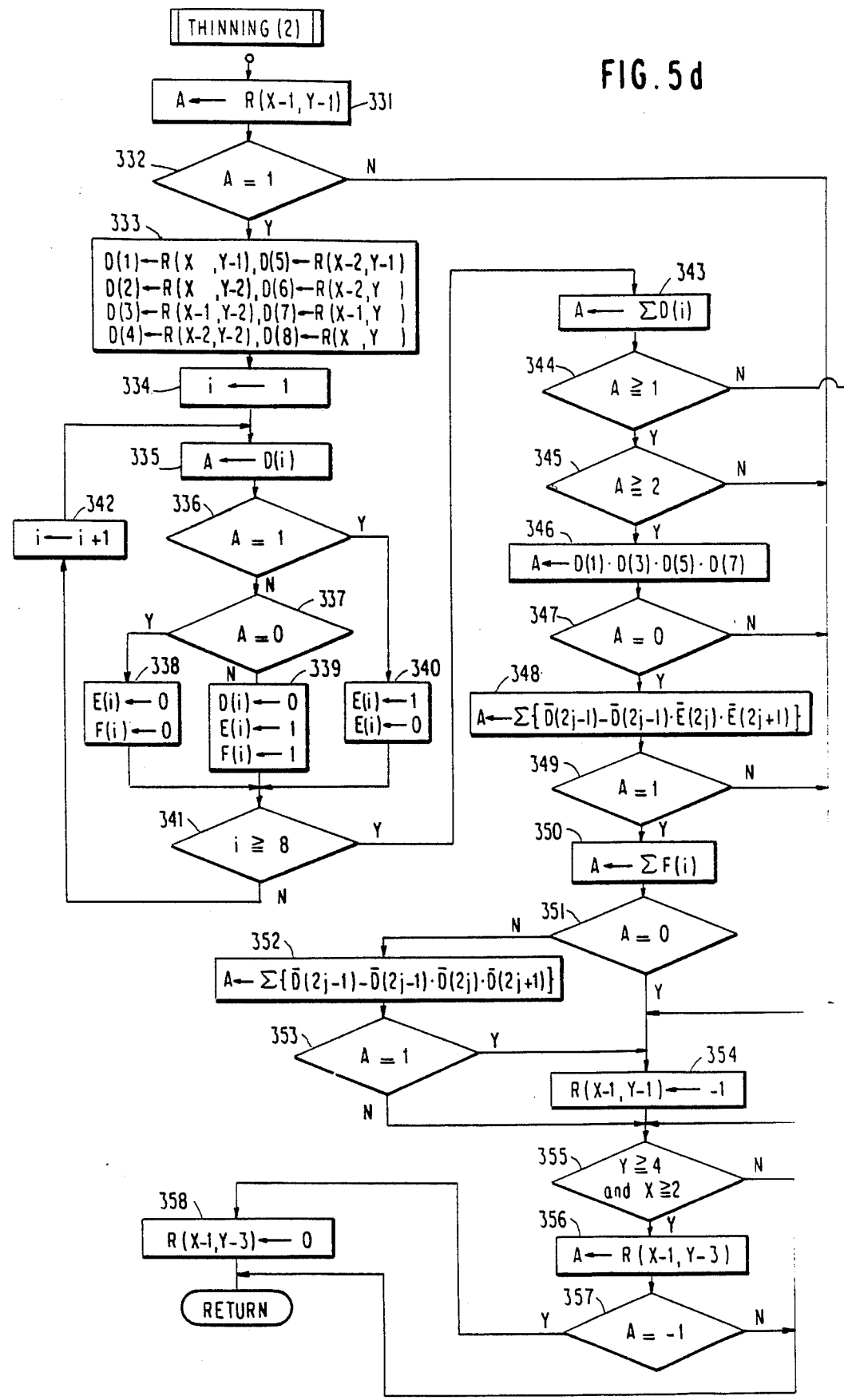

FIGS. 5c and 5d show a sub-flow in which are simultaneously executed the binary-encoding processing in Step 8, the synthesizing processing in Step 9 and the thinning processing in Step 10 shown in FIG. 4. The sub-flow will next be explained with reference to FIGS. 5c and 5d.

In Step 301, the values of X and Y are reset to 0.

When $Y=0$ or $Y=Yb+1$ and/or $X=0$ or $X=Xb+1$, the process proceeds from Step 302 or Step 303 to Step 313, in which the value of the A register is cleared, and the value of the A register is stored in the region of the address (X,Y) in the memory R in Step 314. More specifically, when the X-Y address corresponds to a picture element at the peripheral edge of the window WD shown in FIG. 8, dummy data "0" (representative of the absence of an image component) is stored in that region of the memory R which corresponds to that picture element.

When $1 \leq X \leq Xb$ and $1 \leq Y \leq Yb$, the 45° differentiated gradation data stored at the address (X,Y) in the memory R is loaded into the A register in Step 304, and the value of the A register is binary-encoded on the basis of the first threshold value Th1 in Step 305 and Step 306 or Step 307. Then, the 135° differentiated gradation data stored at the address (X,Y) in the memory S is loaded into the B register in Step 309, and the value of the B register is binary-encoded on the basis of the second threshold value Th2 in Step 309 and Step 310 or Step 311 Thereafter, the exclusive-OR of the value of the A register and the value of the B register is stored in the region of the address (X,Y) in the memory R in Steps 312 and 314. More specifically, when the X-Y address corresponds to a picture element which is within the sampling region, the corresponding 45° differentiated gradation data is binary-encoded on the basis of the first threshold value Th1, while the corresponding 135° differentiated gradation data is binary-encoded on the basis of the second threshold value Th2, and the exclusive-OR of these binary-coded data is stored in the region of the address (X,Y) in the memory R. In this way, the synthesizing processing is effected.

As described above, if $X \geq 2$ and $Y \geq 2$, it is possible to arrange a 3 x 3 pixel matrix with a picture element within the sampling region defined as one which is under consideration. Therefore, on these conditions, the thinning processing (2) in Step 316 is executed ("(2)" is a symbol which is suffixed in order to avoid confusion with the thinning processing in Step 10 shown in FIG. 4). More specifically, the thinning processing (2) is executed with a delay corresponding to one picture element for each of the X and Y addresses with respect to the binary-encoding processing and the synthesizing processing. The addresses of picture elements within the $3 \times 3$ pixel matrix employed in the thinning processing (2) are those shown in FIG. 10.

The thinning processing (2) will next be described with reference to FIG. 5d.

According to the Hilditch thinning algorithm, when a picture element under consideration satisfies the following six conditions, it is set so as to be a candidate for deletion on each occasion, and picture elements determined to be candidates for deletion are finally deleted. Namely, a picture element under consideration is determined to be a candidate for deletion ①  when it is a picture element having an image component;

②  when it is a boundary picture element;

③ when it is a picture element other than those which are at end points;

④ when it is a picture element other than those which are isolated;

⑤ when it is a picture element which leaves connectivity at the time of deletion; and ⑥ when it is a picture element which leaves connectivity at the time of deletion even when picture elements determined to be candidates for deletion are deleted.

In this embodiment, the condition④ is excluded from the above, and an isolated picture element is set so as to be a candidate for deletion (hereinafter referred to as "the condition④ ").

In Steps 331 and 332, the above-described condition① is examined. More specifically, the binary-coded data $R(X-1, Y-1)$ concerning a picture element under consideration which has been stored in the region of the address $(X-1, Y-1)$ in the memory R is stored in the A register, and only when the value of the A register is "1" (representative of the presence of an image component), the process proceeds to Step 333 and those which follow it.

In Step 333, pieces of data concerning the 8 neighboring picture elements relative to the picture element under consideration which are extracted from the $3 \times 3$ pixel matrix are stored in the memories D(1) to D(8), respectively, for the purpose of facilitating the following processing. The relationship between the memories D(1) to D(8) and the 8 neighboring picture elements is such as that shown in FIG. 10.

In Steps 334 to 342, parameters which are to be used in the following processing are set according to the contents of the memories D(1) to D(8). More specifically, with the value of i being renewed sequentially from 1 to 8, the content of the memory D(i) is examined, and when it is 1, 1 is stored in the memory E(i) and 0 in the memory F(i), whereas, when the content of the memory D(i) is 0, 0 is stored in both the memories E(i) and F(i). When the content of the memory D(i) is −1 (i.e., a picture element determined to be a candidate for deletion), the content of the memory D(i) is changed to 0, and 1 is stored in both the memories E(i) and F(i).

In Steps 343 and 344, the above-described condition④ is examined. More specifically, since each of the contents of the memories D(1) to D(8) is 0 when the corresponding picture element has no image component or is a candidate for deletion, if the sum total of the contents of these memories is 0, the picture element under consideration is found isolated; therefore, the process proceeds to Step 354 without executing the processing in Steps that follow Step 354, and "−1" (representative of a picture element determined to be a candidate for deletion) is stored in the memory R(X−1,Y−1) corresponding to the picture element under consideration.

In Step 345, the above-described condition ③ is examined. More specifically, if the sum total of the contents of the memories D(1) to D(8) is 1, it is found that there is only one picture element having an image component among the 8 neighboring picture elements, and it is judged that the picture element under consideration is at an end point.

In Steps 346 and 347, the above-described condition ② is examined. When the picture element under consideration is a boundary picture element, at least one of the picture elements which are adjacent to it is either a picture element having no image component or a picture element determined to be a candidate for deletion. More specifically, the product of the contents of the memories D(1), D(3), D(5) and D(7) is 0.

In Steps 348 and 349, the above-described condition ⑤ is examined. The equation shown in Step 348 is used to obtain a number of connections of the picture element under consideration. In the equation, the over-line represents inversion and j takes a value from 1 to 4. However, when 2j+1=9, this is regarded as 1. If the number of connections is 1, it is possible to delete the picture element concerned, and therefore the process proceeds to Step 350.

In Steps 350 to 353, the above-described condition ⑥ is examined. The sum total of the contents of the memories F(1) to F(8) represents a number of candidates for deletion among the 8 neighboring picture elements. If the value is 0, it means that there is no candidate for deletion among the 8 neighboring picture elements; therefore, the above-described condition ⑥ is satisfied as a matter of course. If there is at least one candidate for deletion among the 8 neighboring picture elements, the number of connections of the picture element under consideration is obtained on the assumption that this candidate for deletion is deleted. The method of obtaining the number of connections is the same as the above. In this case, however, connection between the picture element under consideration and a picture element having an image component is alone taken into consideration, and therefore the content of the memory D is employed in place of that of the memory E.

When the above-described conditions ①, ②, ③, ⑤ and ⑥ are satisfied, or when the conditions ① and ④ are satisfied, the picture element under consideration is set so as to a candidate for deletion, and "−1" is stored in the membory R(X-1,Y-1) in Step 354.

Prior to the description of the processing executed in Step 355 and Steps that follow it, let us refer to FIG. 8. Assuming that the X-Y address is (2,4), the 3×3 pixel matrix which is used to execute the thinning processing (2) is comprised of data concerning picture elements having addresses (0,2), (1,2), (2,2), (0,3), (1,3), (2,3), (0,4), (1,4) and (2,4), respectively. Accordingly, data Y=1 is irrelevant to the processing. In other words, if Y≧4, data Y-3 or less has no effect on the thinning processing (2). Therefore, the condition of Y≧4 is set in Step 355, and if this condition is satisfied, the process proceeds to Steps 356 and 357, in which a picture element having the address (X−1,Y−3) is examined and if this picture element has been set so as to a candidate for deletion, "0" (representative of the absence of an image component) is stored in the region of said address in the memory R and the picture element concerned is deleted in Step 358. More specifically, the deletion is executed with a delay corresponding to two picture elements for the Y-address with respect to the thinning processing (2), and the deletion is executed with a delay corresponding to one picture element for the X-address and with a delay corresponding to three picture elements for the Y-address with respect to both the binary-encoding processing and the synthesizing processing.

In Steps 302 to 320, the binary-encoding processing, the synthesizing processing and the thinning processing (2) are repeatedly executed with the X-Y address sequentially renewed in a manner similar to raster scan. When the X-Y address reaches (Xb+1,Yb+1), the binary-encoding processing and the synthesizing processing are completed.

As described above, the deletion of picture elements determined to be candidates for deletion which is carried out in the thinning processing is executed with a delay corresponding to three picture elements for the Y-address with respect to both the binary-encoding processing and the synthesizing processing. Accordingly, picture elements determined to be candidates for deletion at Y=Yb−1 and Y=Yb within the sampling region are left as they are at the time of completion of the binary-encoding processing and the synthesizing processing. For this reason, the value of Y is newly set to Yb−1 in Step 321, and picture elements determined to be candidates for deletion at from X=1 to X=Xb are deleted in the same way as the above in Steps 322 to 327. Further, the value of Y is renewed to Yb in Step 328, and then picture elements determined to be candidates for deletion at from X=1 to X=Xb are deleted in the same way as the above in Steps 322 to 327.

Figure 5E:
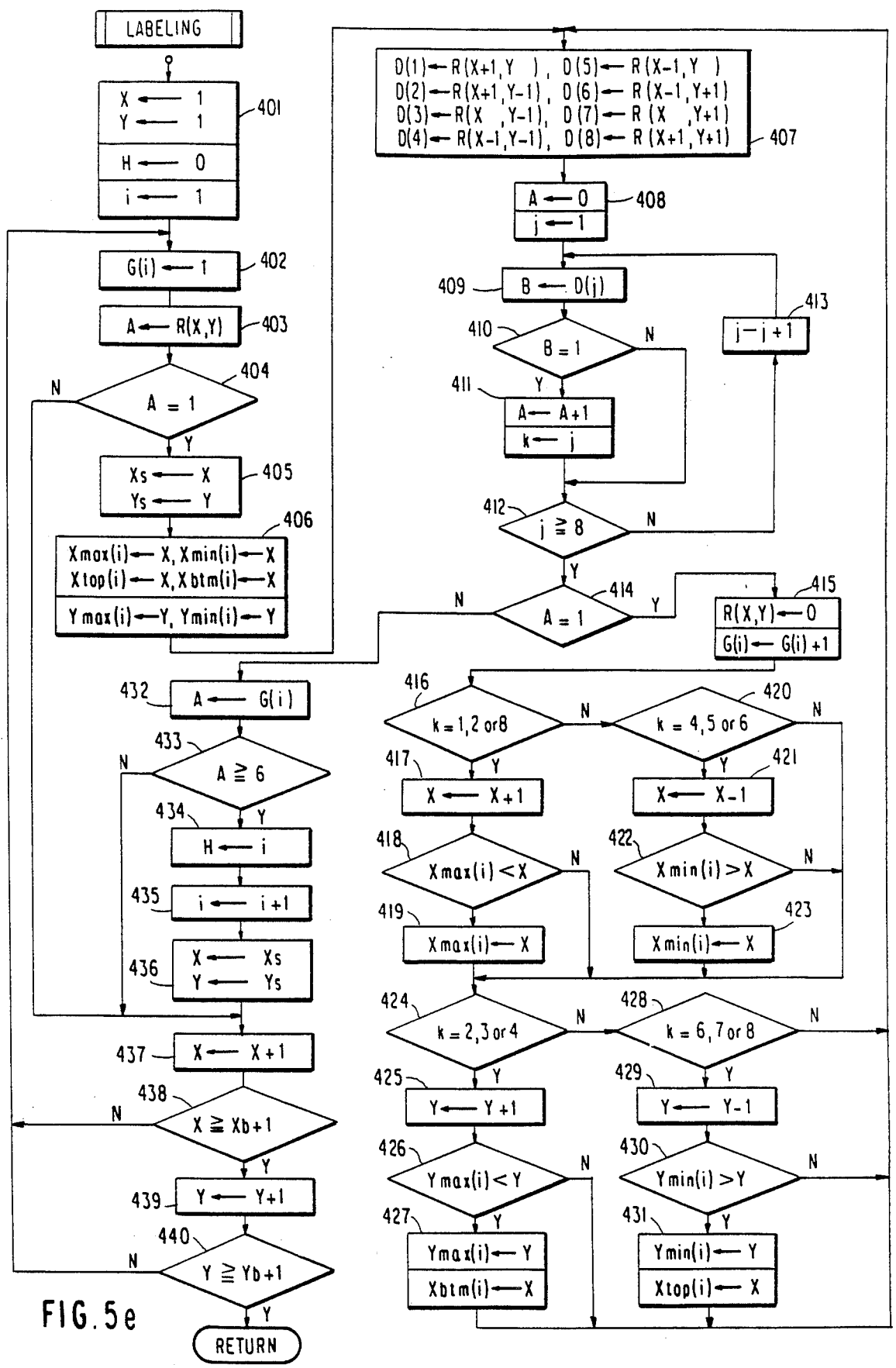

FIG. 5e shows in detail the labeling processing in Step 11 shown in FIG. 4.

In Step 401, the values for X, Y and i are set to 1, and the memory H is cleared.

In Step 402, 1 is stored in that region of the memory G which is represented by the value of i.

In Step 403, binary-coded data stored in the region of the address (X,Y) in the memory R is loaded into the A register, and the value of the loaded data is examined in Step 404. If this value is not "1", the value of X is incremented by 1 in Step 437, or the value of Y is also incremented by 1 in Step 439, thereby effecting raster scan of the contents of the memory R.

If an address at which "1" has been stored is detected in the memory R in this way, X- and Y-addresses at that time are shunted to the memories Xs and Ys, respectively, and in Step 406, the value of X is stored in a region having an address represented by the value of i in each of the memories Xmax, Xmin and Xtop, while the value of Y is stored in a region having an address represented by the value of i in each of the memories Ymas and Ymin.

In Step 407, pieces of data concerning the 8 neighboring picture elements relative to the picture element under consideration which are extracted from the 3×3 pixel matrix arranged with a picture element of the address (X,Y) considered are stored in the memories D(1) to D(8), respectively, for the purpose of facilitating the following processing. The relationship between the memories D(1) to D(8) and the 8 neighboring picture elements is such as that shown in FIG. 9.

In Steps 408 to 413, the contents of the memories D(1) to D(8) are retrieved to count the number of pieces of data concerning the 8 neighboring picture elements which represent "1". If the count is not 1, it means that the picture element under consideration is not one at an end point, and therefore the process proceeds to Step 432.

In this way, the contents of the memory R is subjected to raster scan to detect a picture element at an end point, and when an end point picture element is detected, the data corresponding to the picture element under consideration is deleted and the content of that address in the memory G which is represented by the value of i is incremented by 1 in Step 415.

When the picture element under consideration is at an end point, the value of k set in Step 411 corresponds to the address of that region in the memory D which has "1" stored therein. The following description should be read with reference to FIG. 9.

When the value of k is 1, 2 or 8, the value of X is incremented by 1 in Step 417, and a comparison is made in Step 418 between the content of that address in the memory Xmax which is represented by the value of i and the value of X. When the latter is larger than the former, the value of X is stored in that region of the memory Xmax which has an address represented by the value of i in Step 419.

When the value of k is 4, 5 or 6, the value of X is decremented by 1 in Step 421, and a comparison is made in Step 418 between the content of that address in the memory Mmin which is represented by the value of i and the value of X. When the latter is smaller than the former, the value of X is stored in that region of the memory Xmin which has an address represented by the value of i in Step 423.

When the value of k is 2, 3 or 4, the value of Y is incremented by 1 in Step 425, and a comparison is made in Step 426 between the content of that address in the memory Ymax which is represented by the value of i and the value of Y. When the latter is larger than the former, the value of Y is stored in that region of the memory Ymax which has an address represented by the value of i in Step 427, and the value of X at that time is stored in that region of the memory Xbtm which has an address represented by the value of i.

When the value of k is 6, 7 or 8, the value of Y is decremented by 1 in Step 429, and a comparison is made in Step 430 between the content of that address in the memory Ymin which is represented by the value of i and the value of Y. When the latter is smaller than the former, the value of Y is stored in that region of the memory Ymin which has an address represented by the value of i, and the value of X at that time is stored in that region of the memory Xtop which has an address represented by the value of i in Step 431.

As a result of the above-described processing executed in Steps 416 to 431, the picture element under consideration shifts to a picture element having an image component among the 8 neighboring picture elements relative to the picture element which was under consideration in the processing immediately preceding the present processing. Since at this time the preceding picture element under consideration has already been erased, the picture element under consideration at this time is still one which is at an end point.

Figure 12:
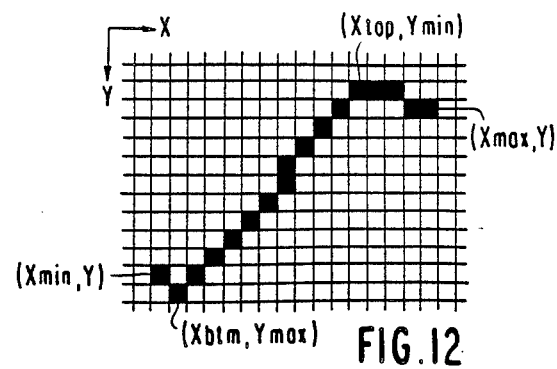
FIG. 12 is a plan view showing one example of a line segment subjected to thinning processing.

By repeating the above operation, a train of thinned picture elements is traced from one end point to the other. When the other end point is reached, the value of the A register is judged to be 0 in Step 414. Therefore, the process proceeds to Step 432. At this time, the maximum value of the X-addresses of the train of picture elements is stored in that region of the memory Mmax which has an address represented by the value of i, the minimum value of the X-addresses of the train of picture elements is stored in that region of the memory Mmin which has an address represented by the value of i, the maximum value of the Y-addresses of the train of picture elements is stored in that region of the memory Ymax which has an address represented by the value of i, the X-address of a picture element having the maximum value of the Y-addresses is stored in that region of the memory Xbtm which has an address represented by the value of i, the minimum value of the Y-addresses of the train of picture elements is stored in that region of the memory Ymin which has an address represented by the value of i, and the X-address of a picture element having the minimum value of the Y-addresses is stored in that region of the memory Xtop which has an address represented by the value of i. Further, the total number of picture elements constituting the train of picture elements is stored in that region of the memory G which has an address represented by the value of i. FIG. 12 shows the relationship between a train of thinned picture elements and data respectively stored in the memories Xmax, Xmin, Xtop, Xbtm, Ymax and Ymin.

In Step 432, the content of that address in the memory G which is represented by the value of i is loaded into the A register, and the loaded value is examined in Step 433. If the total number of a train of picture elements is 6 (a value experimentally determined) or more, the information can contribute to the detection of the vanishing point. Therefore, in such a case, the value of i is stored in the memory H in Step 434, the value of i is incremented by 1 in Step 435, and then the values of X and Y are reset to the addresses stored in the memories Xs and Ys, respectively, before the tracing of the train of thinned picture elements.

With the values of X and Y being sequentially renewed, the above-described processing is executed for all the data stored in the memory R. Upon completion of this processing, a number of line segments (trains of picture elements) each consisting of 6 or more picture elements is stored in the memory H.

Figure 5F:
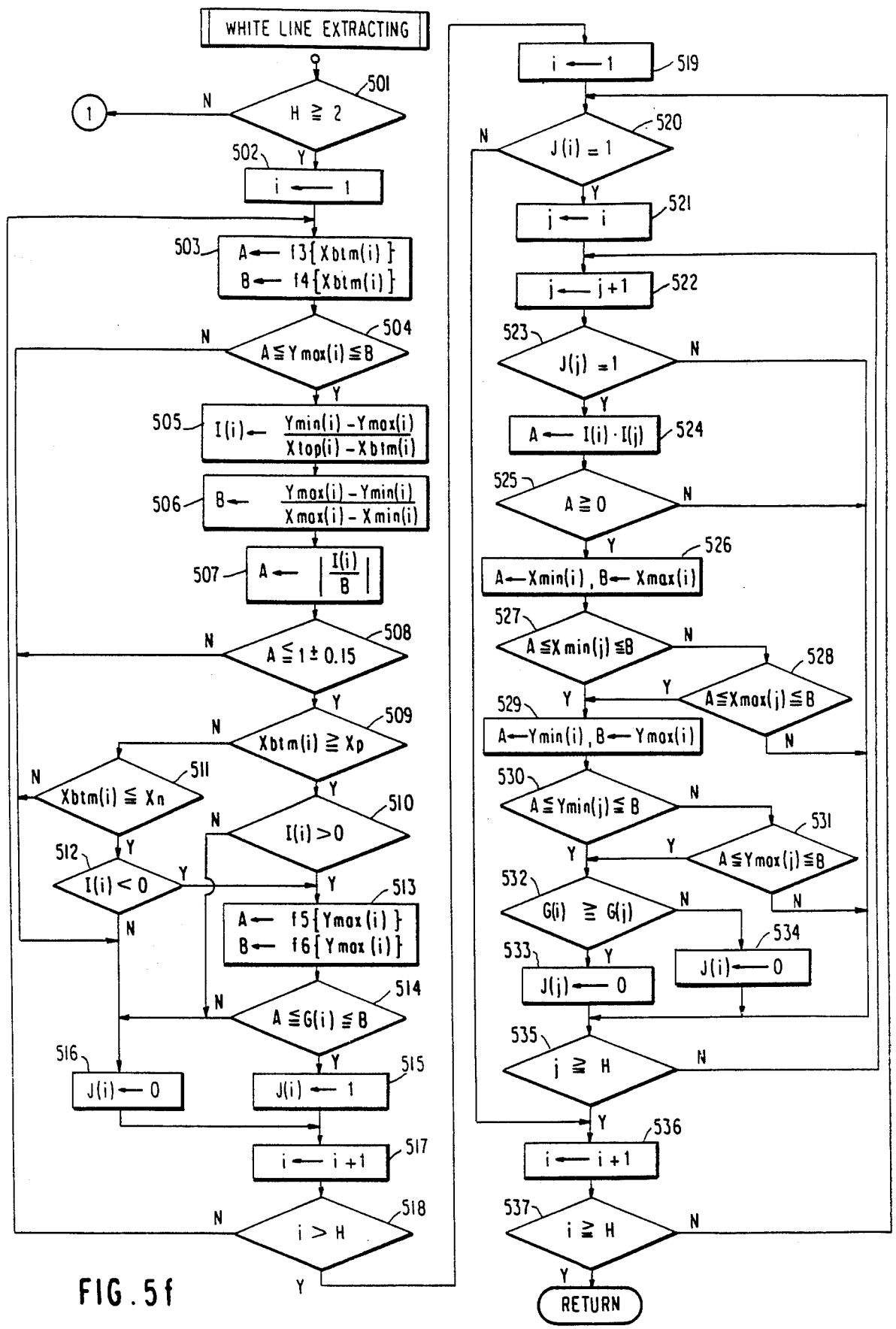

FIG. 5*f* is a flowchart showing in detail the white line extracting processing (Step 12) in the flowchart shown in FIG. 4.

In Step 501, the value stored in the memory H is examined. If the number of line segments is 1 or less, it means that there was a sampling error. Therefore, in such a case, the process returns to Step 2 in the flowchart shown in FIG. 4, and the processing is started over again from the reading of an image.

When there are 2 or more line segments, the value of i is set to 1 in Step 502.

Figure 13:
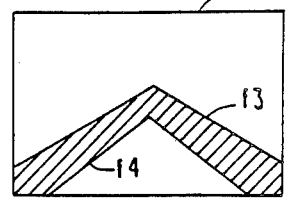
FIG. 13 is a plan view showing a white line extracting region.

As shown in FIG. 13, f3 and f4 are functions which limit the region of distribution of line segments which are preferable for the detection of the vanishing point, the functions f3 and f4 being obtained from data respectively measured when the vehicle was running near the rightmost white line and when the vehicle was running near the leftmost white line. In Steps 503 and 504, line segments which are out of the region defined between these functions f3 and f4 are deleted. More specifically, it is judged whether or not data stored in that region of the memory Ymax which has an address represented by the value of i is included within a range which is defined between values which are obtained by substituting data stored in that region of the memory Xbtm which has an address represented by the value of i into the functions f3 and f4, respectively. If the data is included within said range, the process proceeds to Step 505, whereas, if the data is not within said range, 0 is stored in that region of the memory J which has an address represented by the value of i in Step 516.

In Step 505, the slope of a straight line that links two picture elements respectively having the largest and smallest Y-addresses in the line segment which is under examination (this slope being hereinafter referred to as "the slope of the line segment") is obtained and stored in that region of the memory I which has an address represented by the value of i.

In Step 506, the ratio of the horizontal side to the vertical side of a rectangle inscribed with the line segment under examination is stored in the B register.

Figure 14:
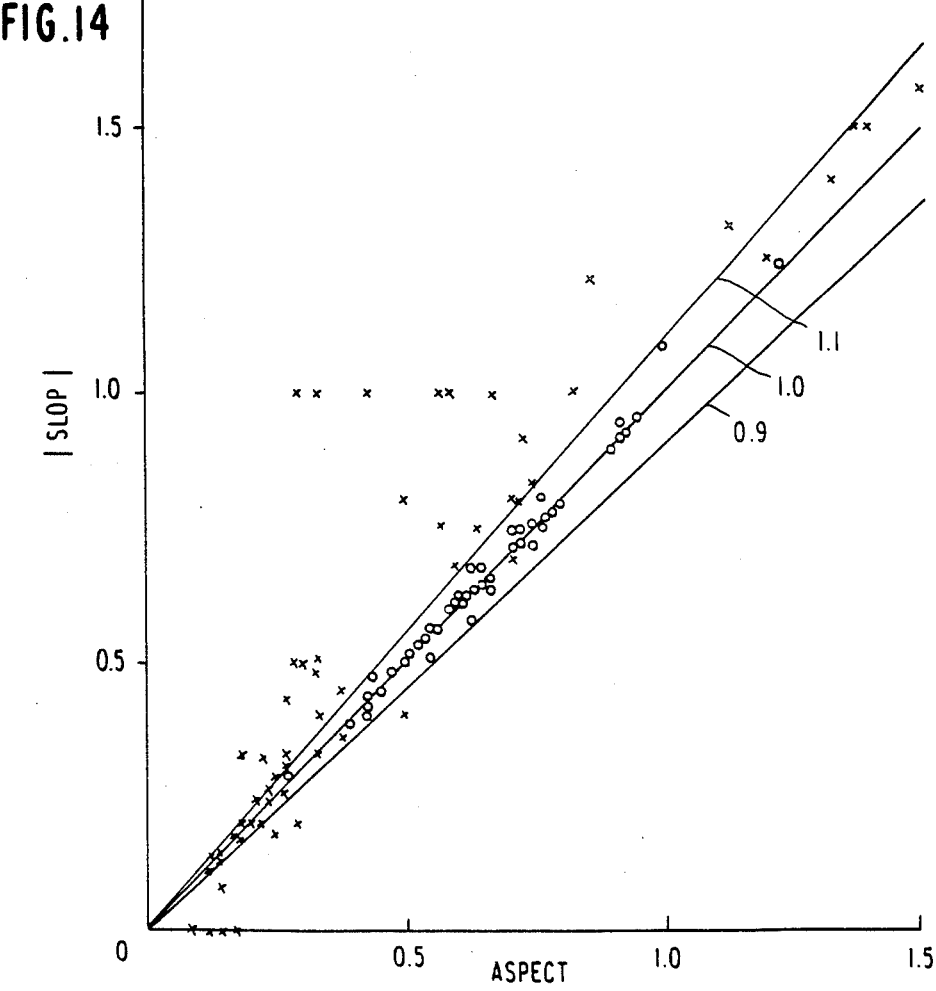
FIGS. 14 to 16 are graphs prepared on the basis of measured data.

In Steps 507 and 508, the ratio of the content of the memory I(i) to the value of the B register is examined. If the absolute value of the ratio is equal to or less than $1 \pm 0.15$, the line segment under examination is further examined in terms of validity. However, if the absolute value of the ratio exceeds $1 \pm 0.15$, the line segment under examination is regarded as invalid, and 0 is stored in that region of the memory J which has an address represented by the value of i in Step 516. Referring to FIG. 14, ASPECT is the value of the B register in this case, while |SLOP| is the content of the memory I(i), that is, the absolute value of the slope of the line segment, in this case. In this graph, data concerning a white line extending along the right- or left-hand side of the vehicle obtained in the actual measurement is denoted by the mark o, while noise is denoted by the mark ×. It will be understood from the graph that o is concentrated in the range where the ratio of |SLOP| to ASPECT is from 0.9 to 1.1.

Figure 15:
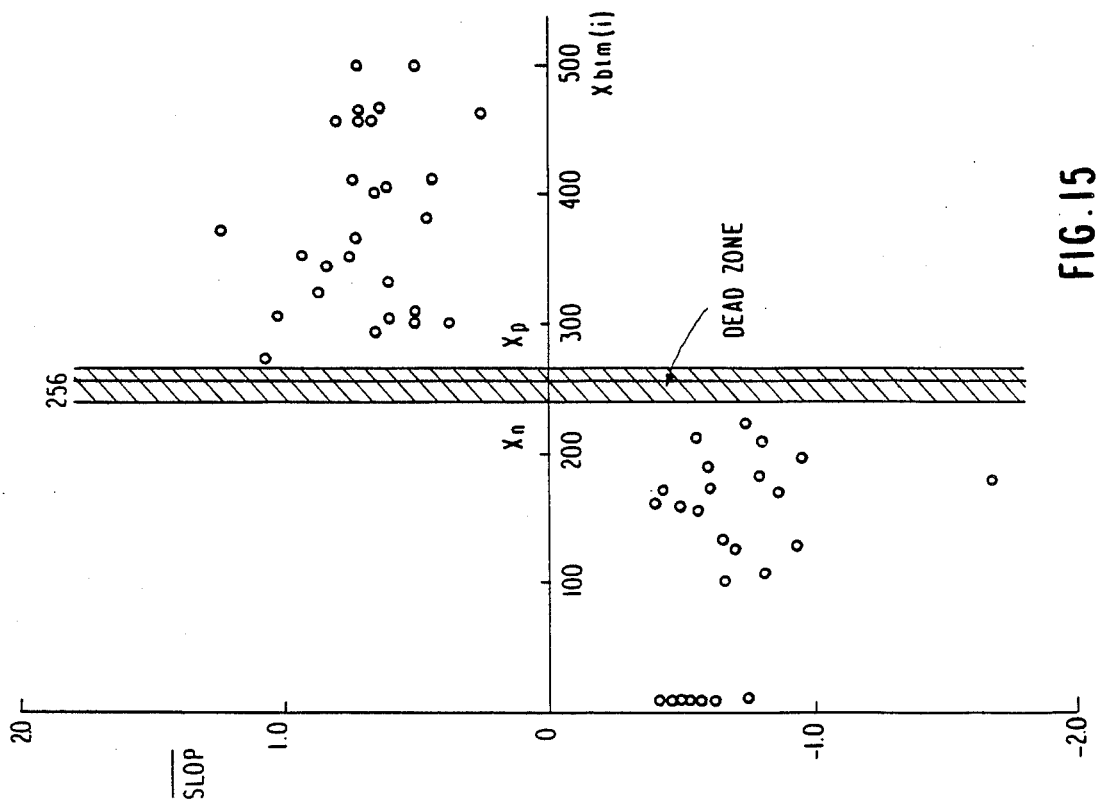

Referring next to FIG. 15, the illustrated graph shows the distribution of the slope of line segments with respect to the X-address on the basis of measured data. It will be understood from the graph that, if the region between $X=X_n$ and $X=X_p$ is set so as to be a dead zone, when the X-address is less than $X_n$, the slope of line segments is negative, whereas, when the X-address is more than $X_p$, the slope of line segments is positive. In Steps 509 to 512 shown in FIG. 5f, examination based on FIG. 15 is carried out. More specifically, when the X-address of a picture element having the minimum Y-address in a line segment under examination is more than $X_p$ and the slope is negative, or when said X-address is less than $X_n$ and the slope is positive, the line segment is regarded as invalid, and 0 is stored in that region of the memory J which has an address represented by the value of i in Step 516.

When the X-address is more than $X_p$ and the slope is positive, or when the X-address is less than $X_n$ and the slope is negative, the line segment is then examined in terms of the length in Steps 513 and 514.

Figure 16:
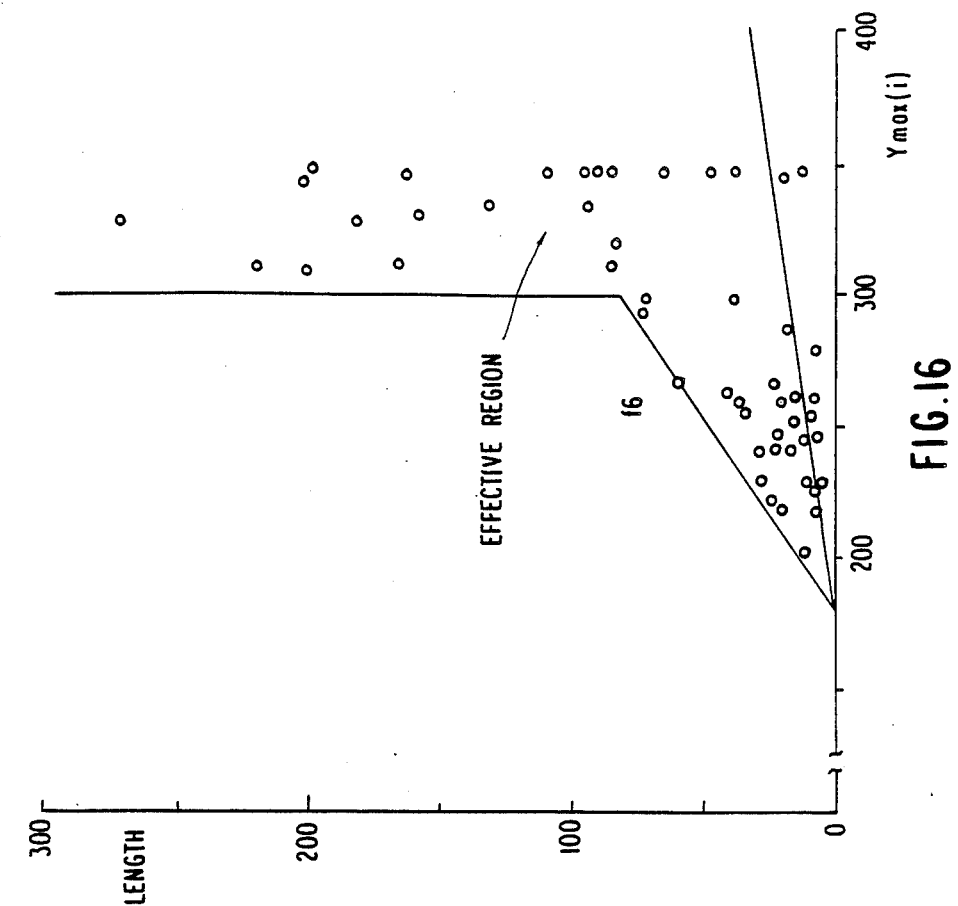

FIG. 16 is a graph showing the distribution of the length of line segments with respect to the Y-address on the basis of measured data. In this embodiment, functions f5 and f6 for limiting a region including many of measured white lines are determined on the basis of the graph.

In Step 513, values which are obtained by substituting the maximum Y-coordinate value in the line segment under examination into the functions f5 and f6 are loaded into the A and B registers, respectively, and it is judged in Step 514 whether or not the length of the line segment is included within the range which is defined between the loaded values. If YES, the line segment under examination is regarded as valid, and 1 is stored in that region of the memory J which has an address represented by the value of i. If NO is the answer in Step 514, the line segment under examination is regarded as invalid, and 0 is stored in that region of the memory J which has an address represented by the value of i in Step 516.

The above-described processing is executed for all the line segments each consisting of 6 or more picture elements with the value of i being successively incremented by 1.

In Step 519, the value of i is reset to 1.

In Step 520, the content of the memory J at the address represented by the value of i is examined. If the content is 0, it means that the line segment under examination has already been judged to be invalid in the processing executed in Steps 503 to 518. Therefore, the value of i is incremented by 1 in Step 536, and a subsequent line segment is then examined.

When a line segment regarded as valid in the processing executed in Steps 503 to 518 is found, the value for j is set by the value of i at that time in Step 521, and the value of j is incremented by 1 in Step 522.

In Step 523, the content of the memory J at the address represented by the value of j at this time is examined. If the content is 0, it means that the line segment under examination has already been judged to be invalid in the processing executed in Steps 503 to 518. Therefore, the value of j is further incremented by 1 in Step 522, and a line segment regarded as valid is searched.

When a line segment regarded as valid is found, the product of the slope of a line segment represented by the value of i and the slope of a line segment represented by the value of j, that is, the product of the content of the memory I(i) and the content of the memory I(j), is obtained in Step 524, and a judgement is made in Step 525 as to whether the resultant value is positive or negative. If the product is negative, it means that the slopes of the two line segments are different from each other. Therefore, the value of j is incremented by 1, and a subsequent line segment is searched.

Figure 17:
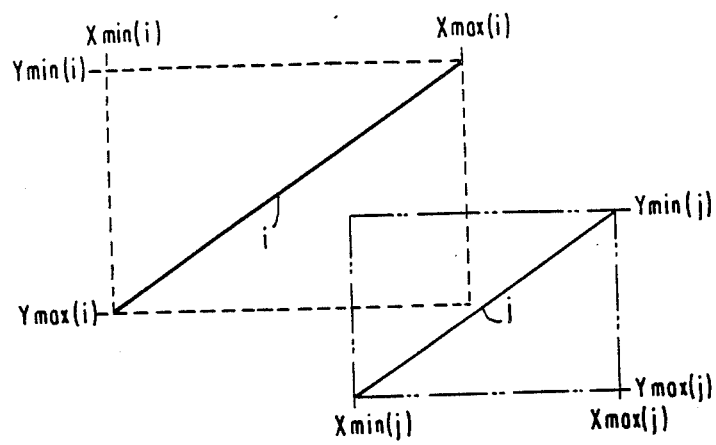
FIG. 17 is a view showing overlapping of line segments.

When the slopes of the two line segments are equal to each other, overlapping of the line segments is examined in Steps 526 to 531. Referring to FIG. 17, in this embodiment, when a rectangle (shown by the chain line) inscribed with a line segment represented by the value of i and a rectangle (shown by the two-dot chain line) inscribed with a line segment represented by the value of j overlap each other, these two line segments are regarded as overlapping each other. More specifically, it is judged that two line segments overlap each other when the content of the memory Xmin or Xmax at the address represented by the value of j is present within the range defined between the content of the memory Xmin at the address represented by the value of i and the content of the memory Xmax at the address represented by the value of i and, at the same time, the content of the memory Ymin or Ymax at the address represented by the value of j is present within the range defined between the content of the memory Ymin at the address represented by the value of i and the content of the memory Ymax at the address represented by the value of i.

When it is judged that two line segments overlap each other, a comparison is made in Step 532 between the respective lengths of the two line segments, that is, the content of the memory G at the address represented by the value of i and the content of the memory G at the address represented by the value of j. When the former is longer than the latter, the content of the memory J at the address represented by the value of j is renewed to 0 in Step 533, whereas, when the latter is longer than the former, the content of the memory J at the address represented by the value of i is renewed to 0 in Step 534. In other words, when it is judged that two line segments overlap each other, the shorter line segment is regarded as invalid and deleted The above-described processing is executed for all the line segments regarded as valid in the processing executed in Steps 503 to 518 with the value of i being successively incremented by 1 in Step 536, thereby effecting extraction of a white line.

Figure 5G:
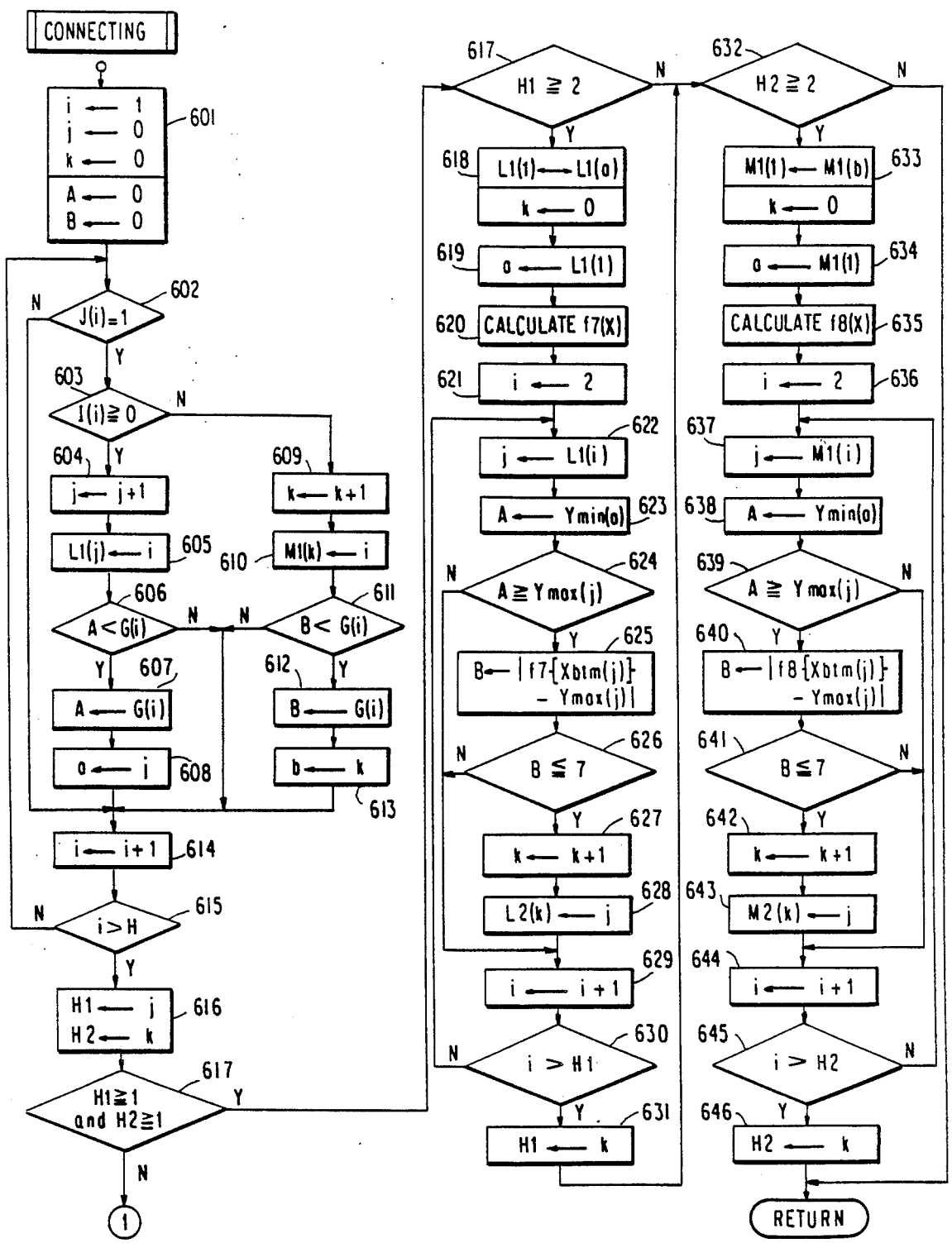

FIG. 5g is a flowchart showing in detail the connecting processing (Step 13) in the flowchart shown in FIG. 4.

First, in Step 601, the value of i is set to 1, while the values of j and k are reset to 0, and the A and B registers are cleared.

In the loop consisting of Steps 602 to 615, a line segment which is the longest among those having positive slopes and a line segment which is the longest among those having negative slopes are detected and a list of line segments having positive slopes and a list of line segments having negative slopes are prepared. In this processing, the value of i corresponds to the address given to each line segment in the above-described labeling processing, while the value of j corresponds to an address in the memory L1, and the value of k corresponds to an address in the memory M1. More specifically, in Steps 602 to 605, when the content of the memory J(i) (j in the parentheses represents the address corresponding to the value of j; the same rule applies to the following description) is 1 (i.e., a line segment extracted by the white line extracting processing) and the content of the memory H(i) is positive (i.e., the slope is positive), the value of j is incremented by 1, and the value of i (the address that specifies said line segment) is written into the memory L1(j). In Steps 602, 603, 609 and 610, when the content of the memory J(i) is 1 (i.e., a line segment extracted by the white line extracting processing) and the content of the memory H(i) is negative (i.e., the slope is negative), the value of k is incremented by 1, and the value of i (the address that specifies said line segment) is written into the memory M1(k). When this loop processing is completed, a list of line segments having positive slopes is completed in the memory L1, and a list of line segments having negative slopes in the memory M1. The lengths of these lists are represented by the respective values of j and k at the time when the loop processing is completed. In Steps 606 to 608, with the A register employed, the length of a line segment having a positive slope selected in Steps 602 and 603, that is, the content of the corresponding memory G, is compared sequentially, and every time a longer line segment is detected, the value of j (an address in the memory L1) at that time is stored in the a register. In Steps 611 to 613, with the B register employed, the length of a line segment having a negative slope selected in Steps 602 and 603, that is, the content of the corresponding memory G, is compared sequentially, and every time a longer line segment is detected, the value of k (an address in the memory M1) at that time is stored in the b register Therefore, the value stored in the a register at the time of completion of the loop processing represents the address in the memory L1 at which is stored the address of the longest line segment having a positive slope, while the value stored in the b register represents the address in the memory M1 at which is stored the address of the longest line segment having a negative slope.

In Step 616, the value of j, that is, the length of the list of line segments having positive slopes prepared in the memory L1, is stored in the memory H1, while the value of k, that is, the length of the list of line segments having negative slopes prepared in the memory M1, is stored in the memory H2.

In Step 617, the length of each list is examined. More specifically, if at least one of the contents of the memories H1 and H2 is 0, it means that there was a sampling error. Therefore, in such a case, the process returns from Step 617 to Step 2 in the flowchart shown in FIG. 4, and the processing is started over again from the reading of an image.

When the content of the memory H1 is 2 or more, that is, when there are 2 or more lines segments having positive slopes, a processing of connecting together the line segments having positive slopes is executed in Steps 617 to 631, whereas, when the content of the memory H2 is 2 or more, that is, when there are 2 or more line segments having negative slopes, a processing of connecting together the line segments having negative slopes is executed in Steps 632 to 646. Since these processings are similar to each other, the processing of connecting together line segments having positive slopes alone will be explained hereinunder.

In Step 618, the content of the memory L1(1) and the content of the memory L1(a) are replaced with each other for the purpose of facilitating the following processing. More specifically, the address of the longest line segment having a positive slope is stored at the top of the memory L1. At this time also, the value of k is reset to 0.

In Step 619, the content of the memory L1(1), that is, the address of the longest line segment having a positive slope, is loaded into the a register, and a function f7(X) is calculated in Step 620. The function f7(X) is an equation expressing a straight line that links together a picture element which is specified by the content of the memory Xtop(a) and the content of the memory Ymin(a) and a picture element which is specified by the content of the memory Xbtm(a) and the content of the memory Ymax(a).

In Step 621, the value of i is set to 2.

In Step 622, the content of the memory L1(i) is set as a value for j, and in Steps 623, 624, 629 and 630, the content of the memory Ymin(a) and the content of the memory Ymax(j) are compared with each other with the value of i being sequentially renewed to thereby search a line segment which is present above the longest line segment having a positive slope.

Figure 18:
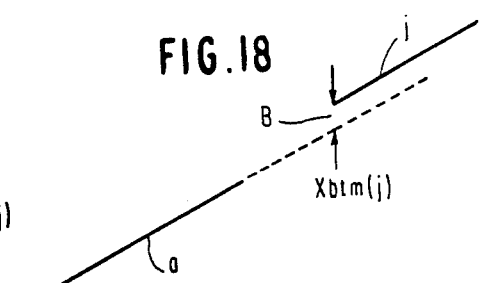
FIG. 18 shows connecting processing executed by the microcomputer shown in FIG. 1.

If such a line segment is found, the content of the memory Xbtm(j) is substituted into the function f7(X) using the value of j at that time to examine the deviation from the content of the memory Ymax(j) in Steps 625 and 626. FIG. 18 shows the way in which the above-described processing is executed. Referring to FIG. 18, the reference symbol a denotes a longest line segment which is specified by the value stored in the a register, while the symbol j denotes a line segment which is located above the longest line segment. The value for the B register obtained in Step 625 represents the difference in terms of the Y-address between the extension of the line segment a and the lower end of the line segment j.

When this difference corresponds to 7 (determined experimentally) or less picture elements, the two line segments are regarded as belonging to the same straight line and then combined together, and the address of the line segment which is combined with the longest line segment is written into the memory L2 in Steps 627 and 628.

When the above-described processing is completed for all the line segments having positive slopes on the list stored in the memory L1, a list of line segments which are combined with the longest line segment having a positive slope is completed in the memory L2, the length of the list being represented by the value of k. Then, the content of the memory H1 is corrected to the length of this list in Step 631.

When the processing executed in Steps 632 to 646 is completed, a list of line segments which are combined with the longest line segment having a negative slope is completed in the memory L2 in the same way as the above, and the content of the memory H2 is corrected to the length of this list.

Figure 5H:
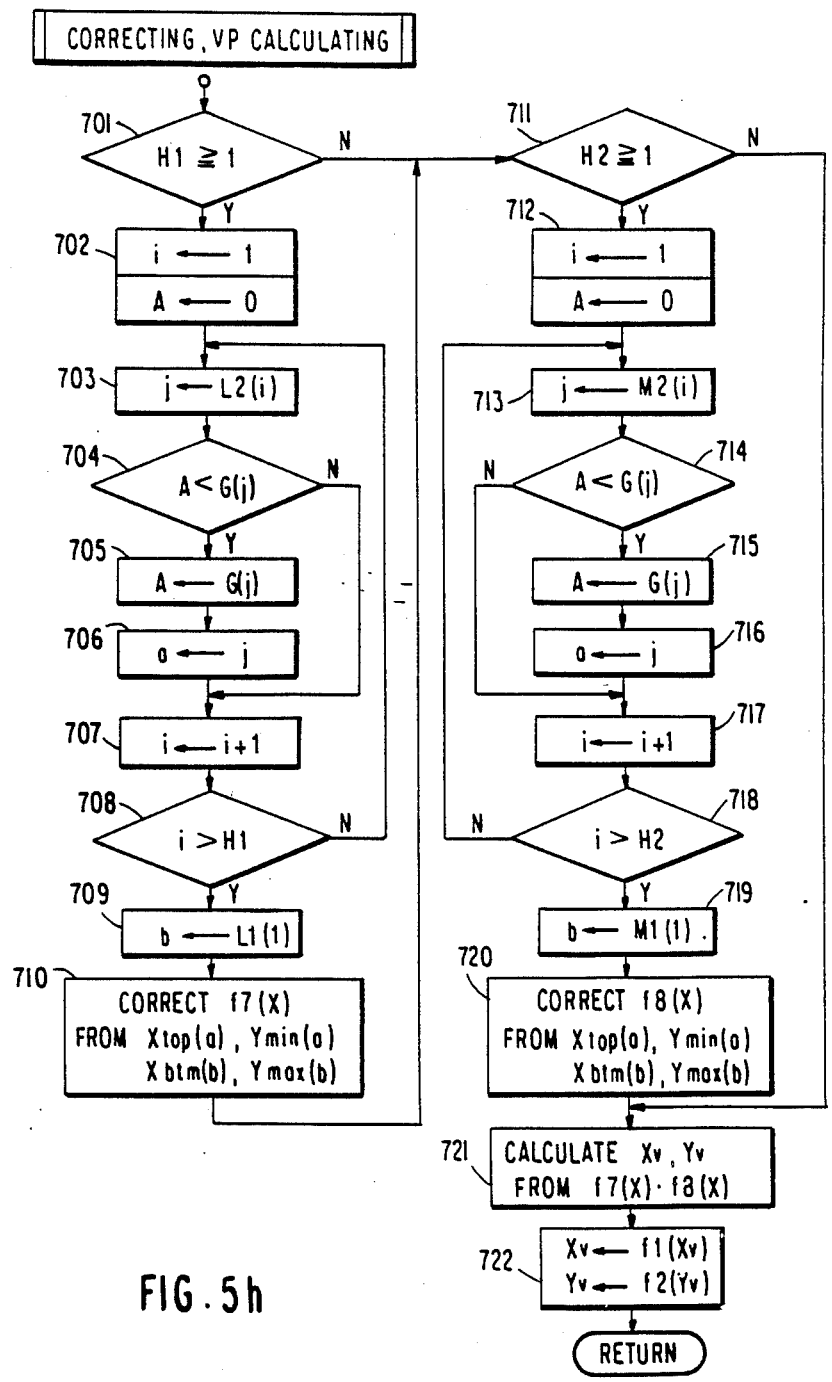

FIG. 5h is a flowchart showing in detail the correcting processing (Step 14) and the VP calculating processing (Step 15) shown in FIG. 4.

In Steps 701 to 710, the function f7(X) representing a straight line having a positive slope for obtaining the vanishing point VP is corrected, whereas, in Steps 711 to 720, the function f8(X) representing a straight line having a negative slope is corrected. Since these processings are similar to each other, the former processing alone will be explained hereinunder.

In Step 701 is examined the number of line segments with positive slopes which are combined to the corresponding longest line segment, said number being detected in the foregoing connecting processing, that is, the content of the memory H. If this number is 0, it is unnecessary to make correction, and the process proceeds to Step 711 without the following processing, whereas, if said number is 1 or more, the value of i is set to 1 and the A register is cleared in Step 702.

In Steps 703 to 708, the list of combined line segments with positive slopes which is stored in the memory L2 is referred to with the value of i being sequentially renewed to search the address of the longest line segment among them by sequential comparison. Upon completion of this processing, the value stored in the a register is representative of the address of the longest line segment among those which are combined with the corresponding longest line segment having a positive slope.

In Step 709, the content of the memory L1(1), that is, the address of the longest line segment having a positive slope, is loaded into the b register.

In Step 710, an equation expressing a straight line that links together a picture element specified by the content of the memory Xtop(a) and the content of the memory Ymin(a) and a picture element specified by the content of the memory Xbtm(b) and the content of the memory Ymax(b) is obtained to correct the function f7(X).

In Steps 711 to 720, after the function f8(X) is corrected in the same way as the above, the condition of f7(X)=f8(X) is set in Step 721 to obtain the X-Y address (Xv,Yv) of the point of intersection, that is, the vanishing point VP.

In Step 722, the address (Xv,Yv) in the X-Y coordinate system is transformed to an address (xv,xy) in the x-y coordinate system by the use of the above described transformation functions f1(X) and f2(Y). These values are used in the α calculating processing in Step 16 and the distance calculating processing in Step 18, which are shown in FIG. 4. As to these processings, the foregoing description should be referred to.

Figure 6:
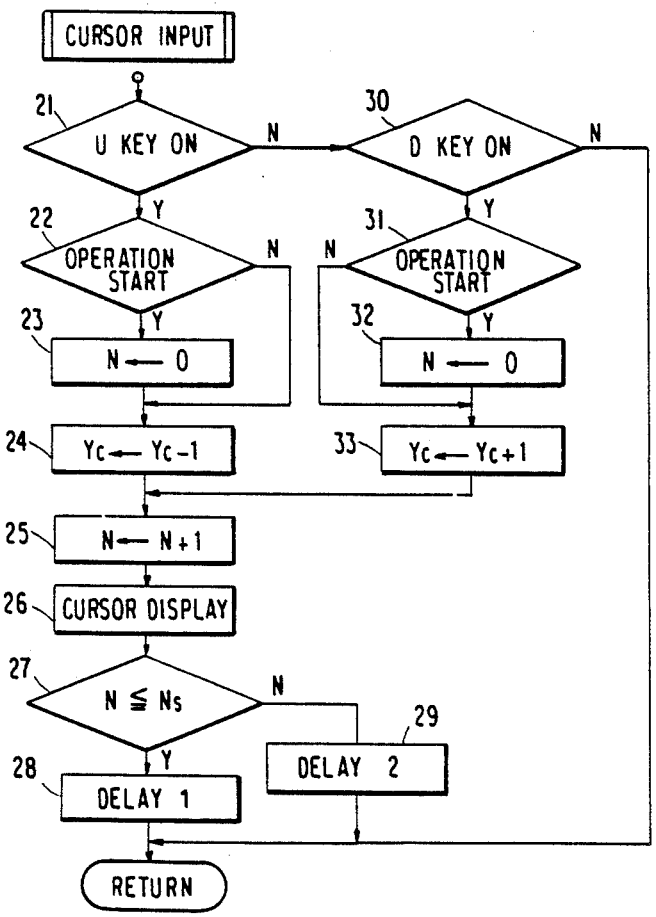
FIG. 6 is a flowchart showing the cursor input processing executed by a microcomputer provided on the control board shown in FIG. 1.

The cursor input processing which is executed by the microcomputer provided on the control board 7a (see FIG. 1) will next be described with reference to FIG. 6.

The cursor input processing is a subroutine which is started in response to the operation of the "UP" key U (written as "U key" in the flowchart) or the "DOWN" key D (written as "D key" in the flowchart).

When the "UP" key U is operated, the count register N is cleared in synchronism with the start of the operation of the key U and the y-address yc of the cursor is decremented by 1 in Steps 22 to 24, whereas, when the "DOWN" key D is operated, the count register N is cleared in synchronism with the start of the operation of the key D and the y-address yc of the cursor is incremented by 1 in Steps 31 to 33.

Thereafter, the value of the count register N is counted up in Step 25, and the y-address yc of the cursor at that time is transferred to the CRT driver 4a (see FIG. 1) in Step 26. The CRT driver 4a displays a cursor at a position corresponding to the transferred address.

If the value of the count register is less than a predetermined value Ns (assumed to be 2 in this embodiment), a delay "DELAY 1" of about 0.5 second is caused in Step 28. When the "UP" key U or the "DOWN" key D is continuously operated, the value of the count register N exceeds Ns. In such a case, therefore, a delay "DELAY 2" for about 0.1 second is caused in Step 29. More specifically, when the "UP" key U is operated, the cursor position i renewed upward on the CRT 4b at a time interval of 0.5 second for the first two operations of the key U and, thereafter, the cursor position is renewed upward at a time interval of 0.1 second. When the "DOWN" key D is operated, the cursor position is renewed downward at a time interval of 0.5 second for the first two operations of the key D and, thereafter, the cursor position is renewed downward at a time interval of 0.1 second.

The following is a description of one application example in which the apparatus of this embodiment was mounted on a vehicle and this vehicle was run on a speedway.

Figure 24:
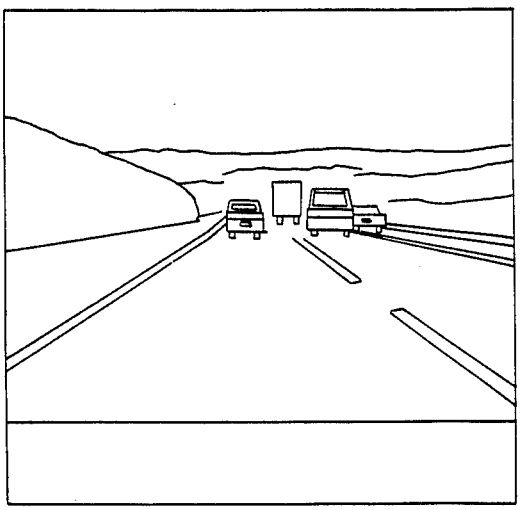

FIG. 24 shows the scene ahead of the vehicle which was taken by the TV camera 6b. The figure shows the scene regenerated on the basis of binary-coded data; it should be understood that the following description is made in regard to a scene which is substantially similar to the illustrated one.

Figure 19:
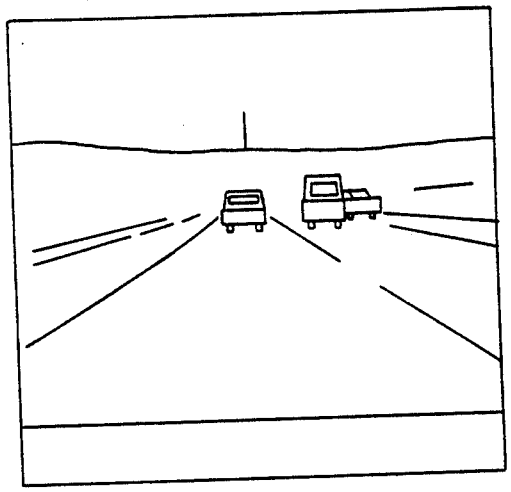
FIGS. 19, 20, 22, 23 and 24 are plan views showing actual image processing executed by the apparatus shown in FIG. 1.
Figure 20:
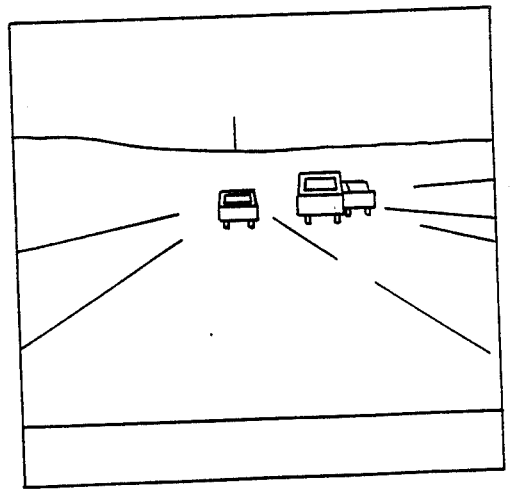

FIG. 19 shows an image obtained by subjecting the scene shown in FIG. 24 to the 135° differentiating processing, while FIG. 20 shows an image obtained by subjecting the scene shown in FIG. 24 to the 45° differentiating processing. Although in the foregoing embodiment the differentiating processing is executed in regard to the image within the window WD, in this example the differentiating processing was executed with .- to the entire image for reference. It will be understood from FIG. 19 that the white line extending along the left-hand side of the vehicle is emphasized and from FIG. 20 that the white line extending along the right-hand side of the vehicle is emphasized. The horizontal line appearing at the lower part of each of FIGS. 19 and 20 is the forward end of the bonnet of the vehicle.

Figure 21:
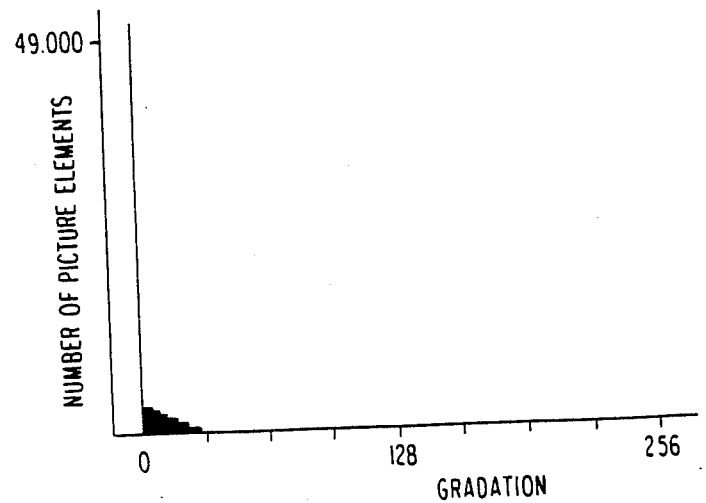
FIG. 21 is a histogram prepared by the microcomputer in the actual image processing.
Figure 22:
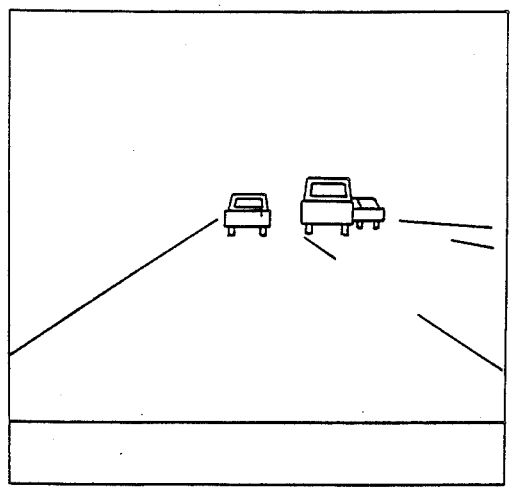

FIG. 21 is a histogram concerning the image shown in FIG. 20, which shows the frequency at which each gradation appears. FIG. 22 shows an image which was prepared by binary-encoding the image shown in FIG. 20 on the basis of a first threshold value obtained from the histogram shown in FIG. 21, further binary-encoding the image shown in FIG. 19 on the basis of a second threshold value obtained from a histogram similarly prepared concerning the image shown in FIG. 19, and synthesizing the two binary-coded images by an exclusive-OR operation. It will be understood from FIG. 22 that noises are removed considerably and the white lines extending along both sides of the vehicle are seen in strong relief against the background.

Figure 23:
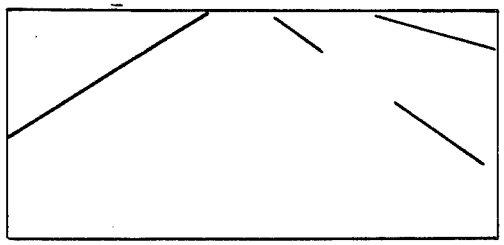

FIG. 23 shows an image obtained by thinning a part of the image shown in FIG. 22. It will be readily understood that the vanishing point is obtained from the illustrated image.

in FIG. 24 was processed as described above, and with the lower end of the vehicle ahead designated, detection of the distance between the two vehicles was carried out. As a result, the detention error was within an allowable range.

It should be noted that, although in the apparatus of the foregoing embodiment software processings are effected by the CPU 1, the present invention is not necessarily limitative thereto. For example, there may be considered modifications wherein hardware devices which are used to execute each processing are unitized to constitute the apparatus or wherein a hardware processing is employed in part of the arrangement.

Although in the foregoing embodiment two equations for calculating the vanishing point are obtained by linearly approximating the longest positive/negative line segment and the longest positive/negative one of the line segments combined with it among the line segments extracted by the white line extraction, it is also possible to obtain two equations replacing them, for example, by the method of least squares using the longest positive/negative line segment and all the line segments which are combined therewith.

As has been described above, according to the present invention, a vanishing point is detected by extracting, for example, continuous or intermittently continuous white lines dividing traffic lanes on the road on the basis of spatial changes in feature of the scene ahead of the vehicle, and the angle of elevation of the optical axis of optical picture information generating means such as a TV camera is obtained on the basis of the detected vanishing point to thereby detect a distance to a designated position. Therefore, it is possible to effect accurate detection of a distance independently of the conditions of the vehicle, such as pitching.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A mobile range finder for use on a first vehicle to detect the distance to a second vehicle at a desired position in a monitoring direction irrespective of the moving state of the first vehicle comprising:

optical picture information generator means installed at a predetermined position on said first vehicle to provide an image of at least a part of a scene in said monitoring direction and generate corresponding picture information on an image plane;

edge extracting means for extracting a region where the picture information generated by said optical picture information generating means shows a distinct change;

component extracting means for extracting a distinct component comprised of lane marking lines on a road in each region extracted by said edge extracting means;

vanishing point determining means including selecting means for selecting from the lines extracted by said component extracting means at least one line included in a preset positive slope region and at least one line included in a preset negative slope region and means for calculating spatial information concerning said vanishing point from a theoretical point or intersection of respective line extensions of said lines and the location of an image of said vanishing point on said image plane;

inclination angle detecting means for determining an angle of elevation between the optical axis of said optical picture information generating means and a reference line extending towards said vanishing point on the basis of the spatial information concerning said vanishing point and the location of said image of said vanishing point on said image plane;

designating means for designating a desired position in said scene in which said second vehicle would first appear;

designated spatial information generating means for generating spatial information corresponding to the desired position designated by said designating means; and distance detecting means for detecting the distance from the first vehicle to the position designated by said designating means to determine the distance from said first vehicle to said second vehicle in said desired position on the basis of said spatial information generated by said designated spatial information generating means, information concerning the level of the position at which said optical picture information generating means is installed and said inclination angle information determined by said inclination angle detecting means.

2. A mobile range finder according to claim 1, wherein said edge extracting means includes differentiating means for spatially differentiating the picture information generated by said optical picture information generating means.

3. A mobile range finder according to claim 2, wherein said differentiating means comprises first and second differentiating means for spatially differentiating the picture information generated by said optical picture information generating means on the basis of positive and negative slopes, respectively.

4. A mobile range finder according to claim 3, wherein said edge extracting means has binary encoding means for binary-encoding the picture information differentiated by said first differentiating means and the picture information differentiated by said second differentiating means and then synthesizing the two pieces of binary-coded picture information to generate synthesized binary-coded picture information.

5. A mobile range finder according to claim 4, wherein said binary-encoding means generates synthesized binary-coded picture information by exclusive- ORing binary-coded information obtained by binary-encoding the picture information differentiated by said first differentiating means and binary-coded information obtained by binary-encoding the picture information differentiated by said second differentiating means.

6. A mobile range finder according to claim 1, wherein said component extracting means includes thinning means for thinning each of the regions extracted by said edge extracting means.

7. A mobile range finder according to claim 1, wherein said vanishing point determining means linearly approximates each of the selected components and detects spatial information concerning the vanishing point from the point of intersection of the respective extensions of said approximated line segments.

8. A mobile range finder according to claim 1, wherein said vanishing point determining means selects from among the components extracted by said component extracting means the longest component of those included in a preset positive slope region and the longest component of those included in a preset negative slope region.

9. A mobile range finder according to claim 8, wherein said vanishing point determining means linearly approximates each of the selected components and detects spatial information concerning the vanishing point from the point of intersection of the respective extensions of said approximated line segments.

10. A mobile range finder according to claim 9, wherein said vanishing point determining means corrects each of said approximated line segments by the selected component corresponding thereto and another component which is substantially continuous with it, and detects spatial information concerning the vanishing point from the point of intersection of the respective extensions of said corrected approximated line segments.

* * * * *